United States Patent
Lo et al.

(10) Patent No.: US 10,051,501 B2
(45) Date of Patent: Aug. 14, 2018

(54) USER EQUIPMENT, MOBILE HOTSPOT EQUIPMENT, BACKHAUL DEVICE AND METHOD FOR ESTABLISHING A PATH LOSS MODEL DATABASE

(71) Applicant: Institute For Information Industry, Taipei (TW)

(72) Inventors: Chih-Yuan Lo, Tainan (TW); Yang-Han Lee, Taoyuan (TW); Yi-Hsueh Tsai, New Taipei (TW); Yi-Ting Lin, New Taipei (TW)

(73) Assignee: Institute For Information Industry, Taipei (TW)

( * ) Notice: Subject to any disclaimer, the term of this patent is extended or adjusted under 35 U.S.C. 154(b) by 147 days.

(21) Appl. No.: 14/957,831

(22) Filed: Dec. 3, 2015

(65) Prior Publication Data

US 2016/0337892 A1 Nov. 17, 2016

Related U.S. Application Data

(60) Provisional application No. 62/162,055, filed on May 15, 2015.

(51) Int. Cl.
*H04W 24/10* (2009.01)
*H04W 24/08* (2009.01)
(Continued)

(52) U.S. Cl.
CPC ........... *H04W 24/10* (2013.01); *G01S 5/0252* (2013.01); *H04L 5/0048* (2013.01); *H04W 24/08* (2013.01); *H04W 24/02* (2013.01); *H04W 84/12* (2013.01)

(58) Field of Classification Search
CPC ..... H04W 24/10; H04W 24/08; H04W 24/02; H04W 84/12; H04L 5/0048; G01S 5/0252
See application file for complete search history.

(56) References Cited

U.S. PATENT DOCUMENTS

| 2006/0075131 | A1 | 4/2006 | Douglas et al. |
| 2009/0088180 | A1* | 4/2009 | LaMance .................. G01S 5/14 455/456.1 |

(Continued)

FOREIGN PATENT DOCUMENTS

WO 2007086784 A1 8/2007

OTHER PUBLICATIONS

Extended European Search Report to the corresponding EP Patent Application No. 15198286.5 rendered by EPO on Sep. 22, 2016, 10 pages.

*Primary Examiner* — Habte Mered
(74) *Attorney, Agent, or Firm* — Skaar Ulbrich Macari, P.A.

(57) ABSTRACT

A user equipment (UE), a mobile hotspot equipment, a backhaul device and a method for establishing a path loss model database are provided. The UE receives a wireless signal from a first surrounding mobile hotspot equipment, and measures the wireless signal during a time interval so as to generate received signal information corresponding to the wireless signal. Thereafter, the UE transmits a measurement response message that includes an identity of the first surrounding mobile hotspot equipment and the received signal information to the backhaul device via the mobile hotspot equipment. Accordingly, the backhaul device establishes a path loss model according to the received signal information and stores the path loss model into a path loss model database.

16 Claims, 22 Drawing Sheets

(51) Int. Cl.
*H04L 5/00* (2006.01)
*G01S 5/02* (2010.01)
*H04W 84/12* (2009.01)
*H04W 24/02* (2009.01)

(56) References Cited

U.S. PATENT DOCUMENTS

| | | | | |
|---|---|---|---|---|
| 2014/0134948 A1* | 5/2014 | Ghose | ............... | H04W 4/008 455/41.2 |
| 2015/0080013 A1* | 3/2015 | Venkatraman | ...... | H04W 64/003 455/456.1 |
| 2015/0146537 A1* | 5/2015 | Panaitopol | ............ | H04W 8/005 370/236 |
| 2015/0146704 A1* | 5/2015 | Yoon | ................... | H04W 48/14 370/338 |
| 2015/0296359 A1* | 10/2015 | Edge | ..................... | H04W 4/22 455/404.2 |

\* cited by examiner

USER EQUIPMENT, MOBILE HOTSPOT EQUIPMENT, BACKHAUL DEVICE AND METHOD FOR ESTABLISHING A PATH LOSS MODEL DATABASE

PRIORITY

This application claims the benefit of priority based on U.S. Provisional Application Ser. No. 62/162,055 filed on May 15, 2015, which is hereby incorporated by reference in its entirety.

FIELD

The present invention relates to a user equipment (UE), a mobile hotspot equipment, a backhaul device and a method for establishing a path loss model database. More particularly, in the present invention, a user equipment connecting to a mobile hotspot equipment measures a wireless signal of a surrounding mobile hotspot equipment and transmits the measured received signal information to a backhaul device via the mobile hotspot equipment so that the backhaul device establishes a path loss model according to the received signal information.

BACKGROUND

With the rapid advancement of the wireless communication technologies in recent years, communication network providers can now provide users with various kinds of services and applications. For example, services such as audio calls, video calls and instant message transmissions can be provided for the users via mobile communication networks; and via the mobile communication networks or wireless local area networks (WLANs), users can obtain location information in real time to know their own locations.

To provide real-time location services for users located within an indoor space, the communication service provider needs to establish an indoor field model in advance. However, currently all indoor field models must be established according to a standard model. Or, the indoor field models can be established by staff through measuring, location by location, signals transmitted by WLAN access points (APs) located at different fixed locations in the indoor space. Therefore, the current mechanism of establishing the indoor field model is time- and labor-consuming, and when arrangement of articles in the indoor space changes, the originally established indoor field model or the indoor field model established according to the standard model will no longer be applicable to this indoor space.

Accordingly, an urgent need exists in the art to provide a mechanism for establishing an indoor field model that can reduce the labor cost and automatically update the indoor field model in response to changes in arrangement of articles in the indoor space.

SUMMARY

The disclosure includes a mechanism of establishing an indoor field model. According to the mechanism of establishing an indoor field model, a user equipment (not a specific measuring equipment) with a function of connecting to a WLAN continuously measures wireless signals transmitted by one or more surrounding mobile hotspot equipments during a time interval to generate corresponding received signal information and transmit the received signal information to a backhaul device, and then the backhaul device establishes a path loss model according to the received signal information and stores the path loss model into a path loss model database. Accordingly, even if arrangement of articles in the indoor space changes, the path loss model database can still be updated to establish an appropriate indoor field model as long as a plurality of user equipments in the indoor space measure wireless signals transmitted from their surrounding mobile hotspot equipments and transmit received signal information to the backhaul device.

The disclosure includes a user equipment for a wireless local area network (WLAN). The user equipment comprises a transceiver and a processor. The transceiver is configured to connect to a backhaul device via a main mobile hotspot equipment and receive a wireless signal from a first surrounding mobile hotspot equipment. The processor is electrically connected to the transceiver, and is configured to measure the wireless signal during a time interval and generate received signal information corresponding to the wireless signal, and enable the transceiver to transmit a measurement response message to a backhaul device of a mobile communication network via the main mobile hotspot equipment. The measurement response message has an identity of the first surrounding mobile hotspot equipment and the received signal information. The backhaul device establishes a path loss model according to the received signal information and stores the path loss model into a path loss model database.

To achieve the aforesaid objective, the present invention further discloses a mobile hotspot equipment. The mobile hotspot equipment establishes a WLAN connection with a user equipment via a WLAN and establishes a mobile communication network connection with a backhaul device via a mobile communication network. The mobile hotspot equipment comprises a transceiver. The transceiver is configured to receive a measurement response message from the user equipment and transmit the measurement response message to the backhaul device. The measurement response message has an identity of a surrounding mobile hotspot equipment and received signal information. The received signal information is generated by the user equipment through measuring a wireless signal during a time interval. The wireless signal is transmitted by the surrounding mobile hotspot equipment. The backhaul device establishes a path loss model according to the received signal information and stores the path loss model into a path loss model database.

The disclosure further includes a backhaul device for a mobile communication network. The backhaul device comprises a storage, a network interface and a processor. The storage is configured to store a path loss model database. The network interface is configured to receive a measurement response message from a user equipment via a mobile hotspot equipment. The measurement response message has an identity of a first surrounding mobile hotspot equipment and received signal information. The received signal information is generated by the user equipment through measuring a wireless signal during a time interval. The wireless signal is transmitted by the first surrounding mobile hotspot equipment. The processor is electrically connected to the network interface and the storage, and is configured to establish a path loss model according to the received signal information and store the path loss model into the path loss model database.

The disclosure also includes a method for establishing a path loss model database for use in a backhaul device. The method for establishing a path loss model database comprises the following steps of: receiving a measurement response message from a user equipment via a mobile hotspot equipment, the measurement response message having an identity of a first surrounding mobile hotspot equipment and received signal information, and the received signal information being generated by the user equipment through measuring a wireless signal during a time interval, the wireless signal being transmitted by the first surrounding mobile hotspot equipment; and establishing a path loss model according to the received signal information and storing the path loss model into the path loss model database.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. The present invention relates to a user equipment (UE), a mobile hotspot equipment, a backhaul device and a method for establishing a path loss model database. It shall be appreciated that, these example embodiments are not intended to limit the present invention to any specific examples, embodiments, environment, applications or particular implementations described in these example embodiments. Therefore, description of these example embodiments is only for purpose of illustration rather than to limit the present invention, and the scope shall be governed by the claims. Besides, in the following embodiments and the attached drawings, elements unrelated to the present invention are omitted from depiction; and dimensional relationships among individual elements in the attached drawings are illustrated only for ease of understanding, but not to limit the actual scale.

Figure 1:
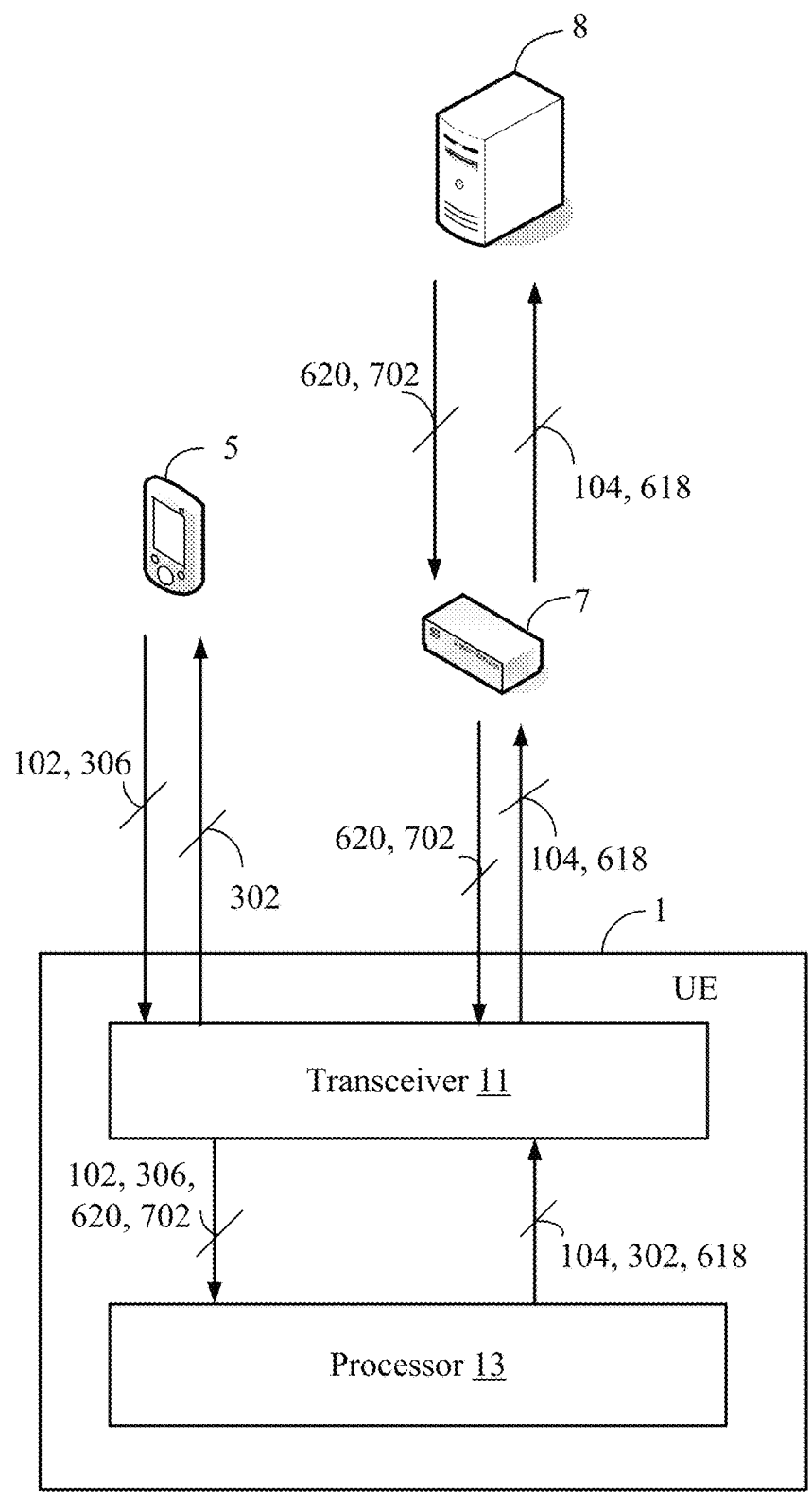
FIG. 1 is a schematic view of a user equipment 1 according to the present invention.

Please refer to FIG. 1, FIG. 2, FIG. 3, and FIG. 4 for a first embodiment of the present invention. FIG. 1 depicts a user equipment (UE) 1 used in a wireless local area network (WLAN). The user equipment 1 may be a handheld device, e.g., a mobile phone, a personal digital assistant (PDA), a tablet computer or some other device having a function of connecting to a WLAN and a signal processing function. In this embodiment, the user equipment 1 connects to the backhaul device 8 via a main mobile hotspot equipment (MMHE) 7.

It shall be appreciated that, the main mobile hotspot equipment 7 is a device having both a function of connecting to a mobile communication network and a function of connecting to a WLAN. The user equipment 1 and the main mobile hotspot equipment 7 connect with each other via a WLAN specified in IEEE 802.11, and the main mobile hotspot equipment 7 connects to the backhaul device 8 via the mobile communication network so that data transmissions between the user equipment 1 and the backhaul device 8 can be accomplished. It shall be appreciated that, in this embodiment, the mobile communication network is deployed on the basis of a $4^{th}$ generation mobile communication system, e.g., the Long Term Evolution (LTE) mobile communication system; however, in other embodiments, the mobile communication network may also be deployed on the basis of a $2^{nd}$ generation or $3^{rd}$ generation mobile communication system, e.g., a Global System for Mobile Communications (GSM), a Universal Mobile Telecommunications System (UMTS) or the like.

Furthermore, as will be readily appreciated by those of ordinary skill in the art, the "mobile hotspot equipment" set forth herein may be a mobile router, a user equipment or any device having the same function. The backhaul device 8 may be any of or any combination of a macro cell, a small cell, and any network server of a core network, and can establish a path loss model for a plurality of areas in an indoor space according to signal measurement results from the user equipment 1. How the path loss model is established by the backhaul device 8 for the areas in the indoor space will be described more clearly.

Figure 2:
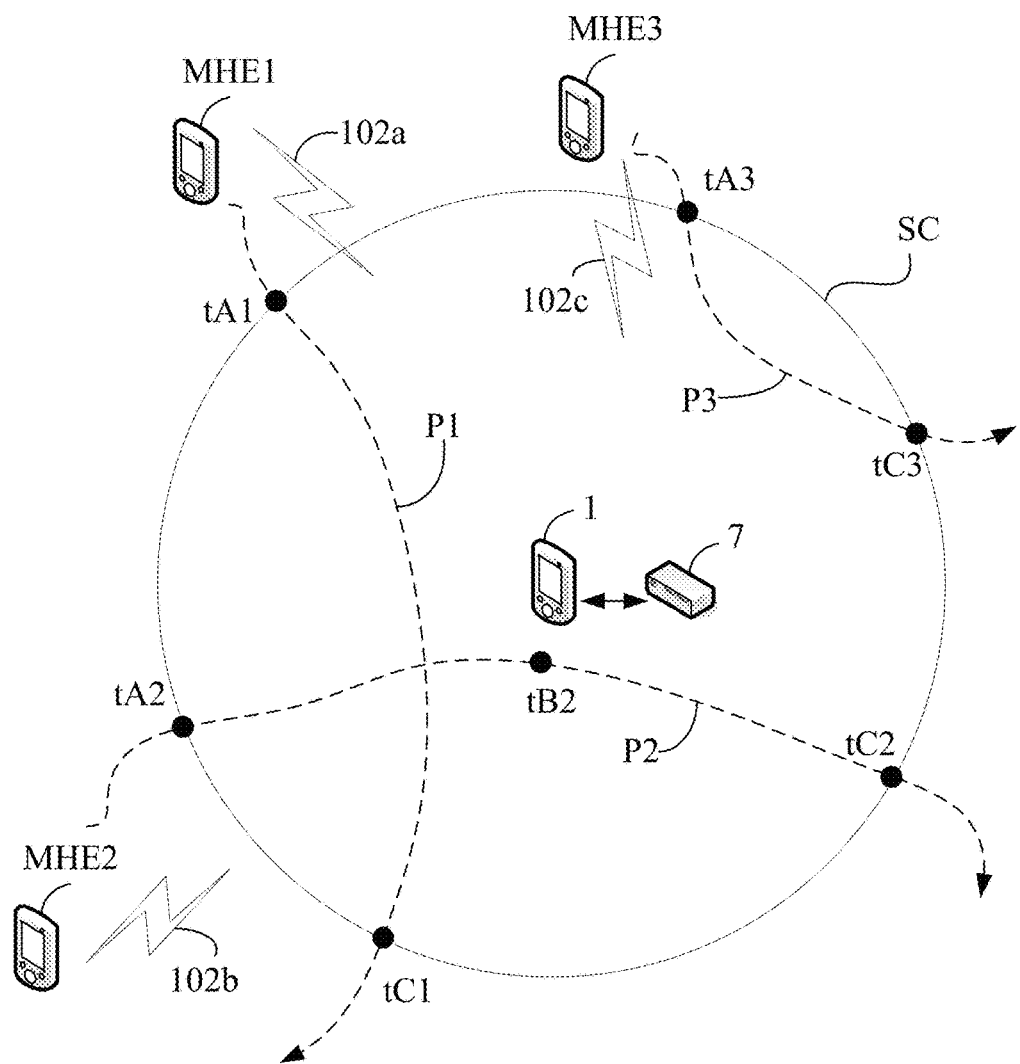
FIG. 2 is a schematic view illustrating moving paths of surrounding mobile hotspot equipments MHE1 to MHE3 with respect to the user equipment 1 according to a first embodiment to a third embodiment of the present invention.

As shown in FIG. 1, the user equipment 1 comprises a transceiver 11 and a processor 13. The transceiver 11 connects to a backhaul device 8 via the main mobile hotspot equipment 7. The transceiver 11 further receives a wireless signal 102 (e.g., a wireless signal 102a) from a surrounding mobile hotspot equipment 5 (e.g., a surrounding mobile hotspot equipment MHE1). Specifically, as shown in FIG. 2, the user equipment 1 may receive wireless signals 102a, 102b, 102c from a plurality of surrounding mobile hotspot equipments (i.e., a surrounding mobile hotspot equipment MHE1, a surrounding mobile hotspot equipment MHE2, and a surrounding mobile hotspot equipment MHE3) within a signal coverage SC. By virtue of the mobility behavior of the surrounding mobile hotspot equipments, the present invention measures the strengths (received signal strengths or SNR values) of wireless signals transmitted by the surrounding mobile hotspot equipments to help the backhaul device 8 in establishing the field model of the indoor space where the user equipment 1 is located. It shall be appreciated that, the signal coverage SC is decided by the transmission power specified in the WLAN specification, and in FIG. 2, it is assumed in this embodiment that the user equipment 1 and the surrounding mobile hotspot equipments substantially have the same transmission power as each other, so wireless signals transmitted beyond the signal coverage SC cannot be received by the user equipment 1.

For example, as shown in FIG. 2, the surrounding mobile hotspot equipments MHE1, MHE2, MHE3 have respective movement paths P1, P2, P3 at different time points. Taking the movement path P2 of the surrounding mobile hotspot equipment MHE2 as an example for description, the surrounding mobile hotspot equipment MHE2 enters into the signal coverage SC at a time point tA2 and moves closer to the user equipment 1 gradually. The surrounding mobile hotspot equipment MHE2 becomes the closest to the user equipment 1 at a time point tB2, then moves away from the user equipment 1 gradually, and moves out of the signal coverage SC at a time point tC2. In this process, wireless signals 102b of different signal strengths (i.e., different attenuation levels of the wireless signals at different locations in the movement path P2) are received in succession by the user equipment 1 at different time points.

The processor 13 is electrically connected to the transceiver 11, and is configured to continuously measure wireless signals 102 during a time interval (the user equipment 1 is substantially stationary during this time interval) and generate received signal information corresponding to the wireless signals 102. Specifically, the received signal information may be received signal strength (RSS) information or signal to noise ratio (SNR) information. Then, the processor 13 loads an identity of the measured object (taking the surrounding mobile hotspot equipment MHE1 as an example) and the corresponding received signal information into a measurement response message 104 and enables the transceiver 11 to transmit the measurement response message 104 to a backhaul device 8 in a mobile communication network via the main mobile hotspot equipment 7. In other words, each time a wireless signal 102 is measured, the processor 13 generates corresponding received signal information and enables the transceiver 11 to transmit the measurement response message 104 to the backhaul device 8. Taking the surrounding mobile hotspot equipment MHE1 as an example, the measurement response message 104 has an identity of the surrounding mobile hotspot equipment MHE1 and the received signal information. Thus, the backhaul device 8 can establish a path loss model according to the received signal information and stores the path loss model into a path loss model database.

Figure 3:
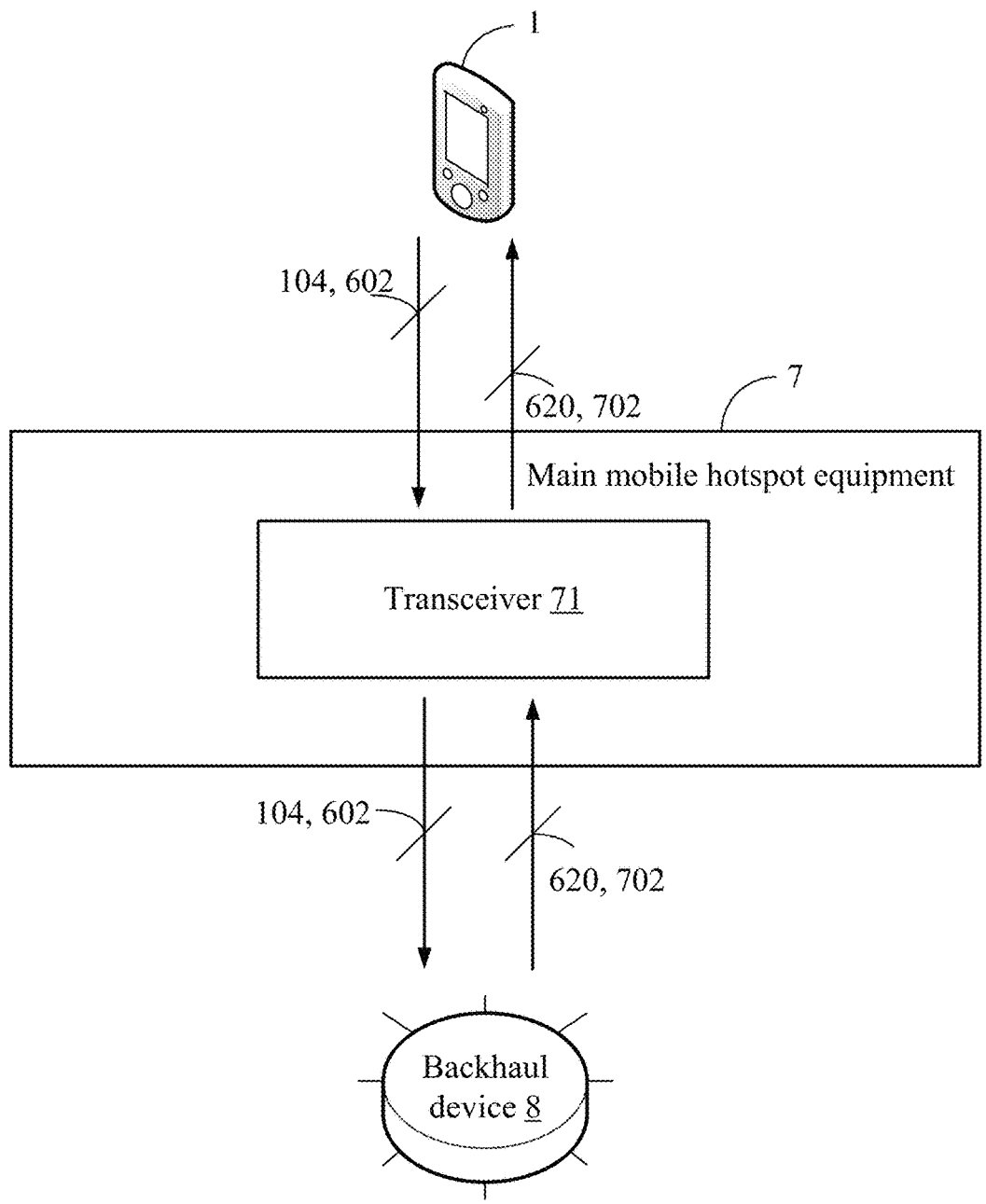
FIG. 3 is a schematic view of a main mobile hotspot equipment 7 according to the present invention.

FIG. 3 depicts a schematic view of a main mobile hotspot equipment 7 (which corresponds to the "main mobile hotspot equipment" and the "mobile hotspot equipment" described in the claims). In this embodiment, the user equipment 1 connects to the backhaul device 8 via the main mobile hotspot equipment 7. Specifically, as described above, the main mobile hotspot equipment 7 establishes a WLAN connection with the user equipment 1 via a WLAN and establishes a mobile communication network connection with the backhaul device 8 via a mobile communication network. The main mobile hotspot equipment 7 comprises a transceiver 71 configured to receive the measurement response message 104 form the user equipment 1 and transmit the measurement response message 104 to the backhaul device 8. Also as described above, the backhaul device 8 may be a base station (e.g., one of a macro cell (eNB) and a small cell), or a combination of at least one network server in the core network and a base station.

Figure 4:
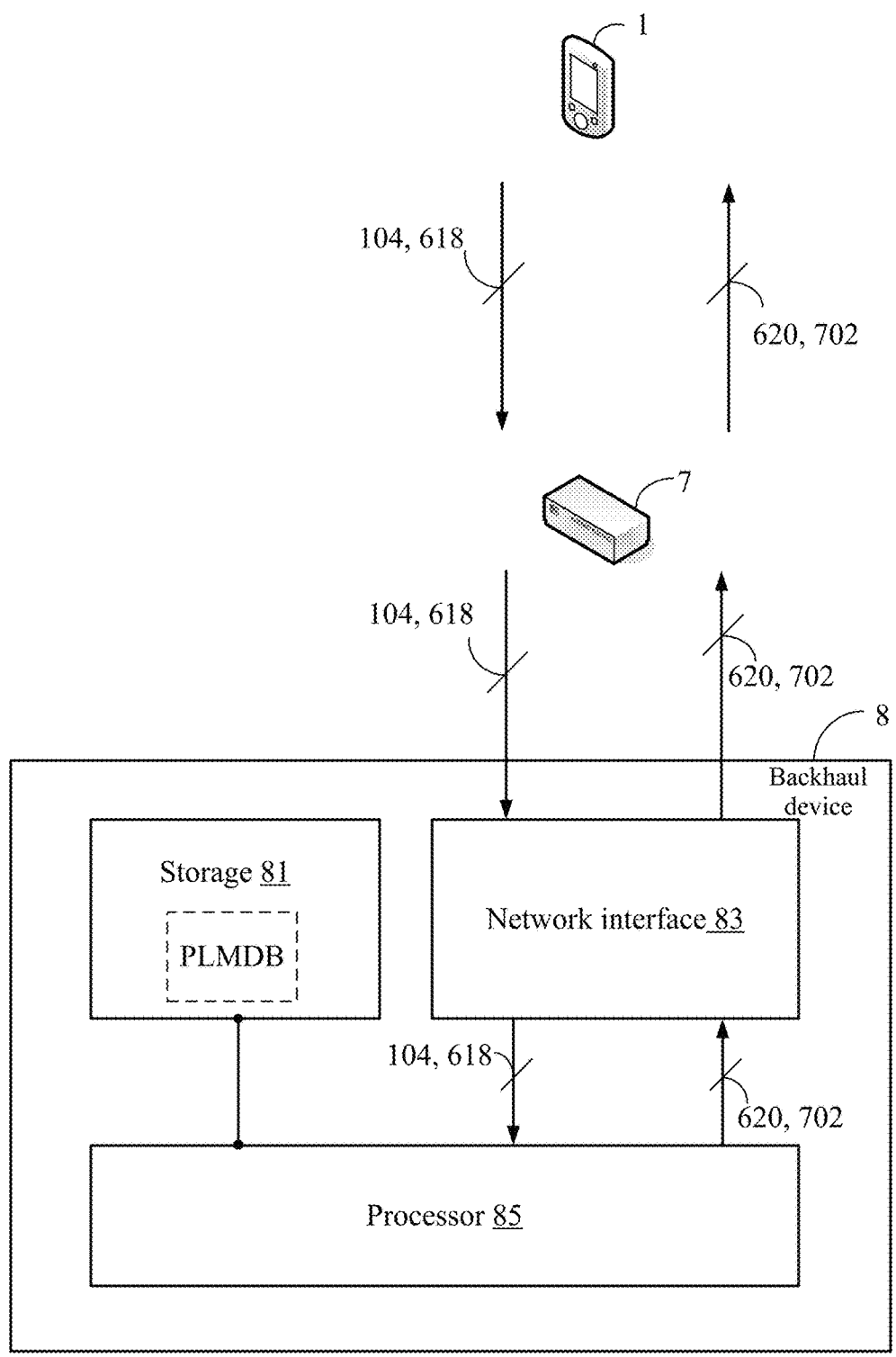
FIG. 4 is a schematic view of a backhaul device 8 according to the present invention.

Hereinbelow, how the backhaul device 8 establishes a path loss model will be further described. FIG. 4 is a schematic view of the backhaul device 8 of the present invention. The backhaul device 8 of the present invention is for use in a mobile communication network, and comprises a storage 81, a network interface 83 and a processor 85. The storage 81 stores a path loss model database PLMDB, and may be a computer readable recording medium or a combination of computer readable recording media that provides a permanent storage, e.g., a flash memory, a hard disc, or any other storage device well known in the art and having the same functions.

The network interface 83 may be a wired network interface or consist of a wireless network interface and a wired network interface. The network interface 83 receives the measurement response message 104 from the user equipment 1 via the main mobile hotspot equipment 7. As described previously, the measurement response message 104 has the identity of the surrounding mobile hotspot equipment 5 (e.g., the surrounding mobile hotspot equipment MHE1) and the received signal information. The received signal information is generated by the user equipment 1 through measuring the wireless signals 102 transmitted by the surrounding mobile hotspot equipment 5 during a time interval. Further speaking, the network interface 83 may continuously receive a plurality of measurement response messages 104 from the user equipment 1, and each of the measurement response messages 104 comprises an identity of one of a plurality of different surrounding mobile hotspot equipments and the corresponding received signal information. In another embodiment, the user equipment 1 may also load the identities of the plurality of surrounding mobile hotspot equipments and the pieces of corresponding received signal information into a single measurement response message 104 and transmit the measurement response message 104 to the backhaul device 8 so that the measurement response message 104 received by the backhaul device 8 comprises the identities of the plurality of surrounding mobile hotspot equipments and the respective pieces of received signal information. The processor 85 is electrically connected to the network interface 83 and the storage 81, and is configured to establish a path loss model according to the received signal information and stores the path loss model into the path loss model database PLMDB.

As shown in FIGS. 1~4 and FIGS. 5A~5B, a second embodiment of the present invention is an extension of the first embodiment. Various types of wireless signals 102 will be described in detail in this embodiment. When the backhaul device 8 detects that the main mobile hotspot equipment 7 is to enter into the indoor space where a field model is to be established or when the user equipment 1 requests a location service, the processor 85 of the backhaul device 8 generates a measurement request message 702 and enables the network interface 83 to transmit the measurement request message 702 to the user equipment 1 via the main mobile hotspot equipment 7. Then, during the time interval, the user equipment 1 measures the wireless signals 102 from the surrounding mobile hotspot equipment 5 in response to the measurement request message 702. It shall be appreciated that, the backhaul device 8 may transmit the measurement request message 702 to the user equipment 1 in various circumstances. For example, because the arrangement of articles in the indoor space may vary with time, the backhaul device 8 may periodically transmit the measurement request message 702 to the user equipment located in the indoor space to request the user equipment to measure wireless signals of its surrounding mobile hotspot equipments so that the field model of the indoor space can be updated automatically. In another circumstance, the backhaul device 8 also transmits the measurement request message 702 to the user equipment 1 when the user equipment 1 requests a location service.

Figure 5A:
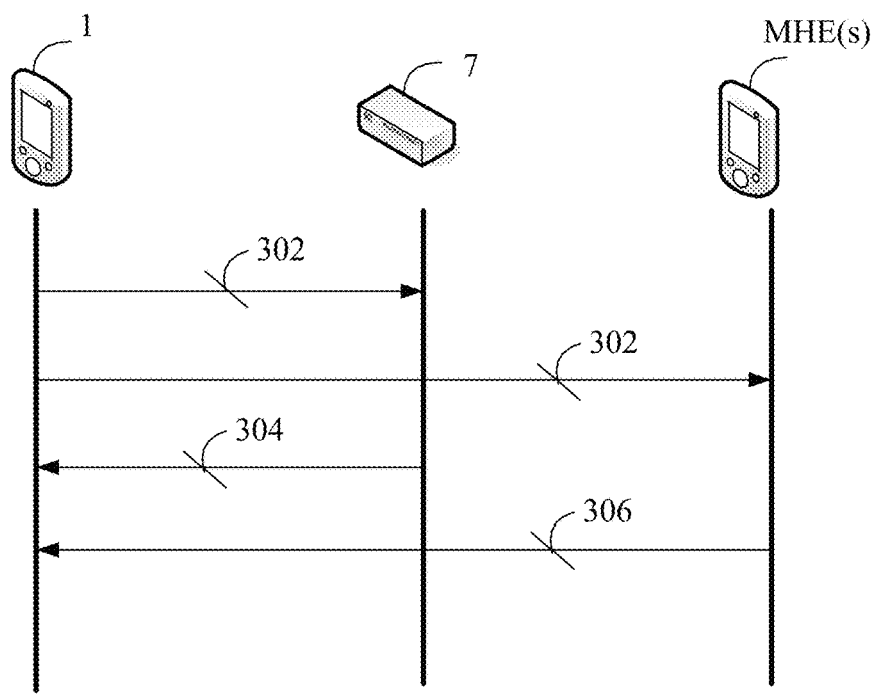
FIGS. 5A-5B illustrate signal transmissions between the user equipment 1 and the main mobile hotspot equipment 7 and the surrounding mobile hotspot equipments MHE(s) according to the second embodiment of the present invention.

As shown in FIG. 5A, after the user equipment 1 receives the measurement request message 702 from the backhaul device 8 via the main mobile hotspot equipment 7, the processor 13 of the user equipment 1 further generates a probe request signal 302 according to the measurement request message 702 and enables the transceiver 11 to transmit the probe request signal 302. In detail, the transceiver 11 may broadcast the probe request signal 302 to each of the surrounding mobile hotspot equipments (e.g., MHE1, MHE2, MHE3) through broadcasting. In this way, each of the surrounding mobile hotspot equipments can receive the probe request signal 302 and transmit back a probe response signal 306 (i.e., a wireless signal 102) in response to the probe request signal 302. The probe response signal 306 transmitted by each of the surrounding mobile hotspot equipments MHE(s) may carry a service set identifier (SSID) so that the user equipment 1 can obtain the identities of the surrounding mobile hotspot equipments from the probe response signal 306.

Figure 7A:
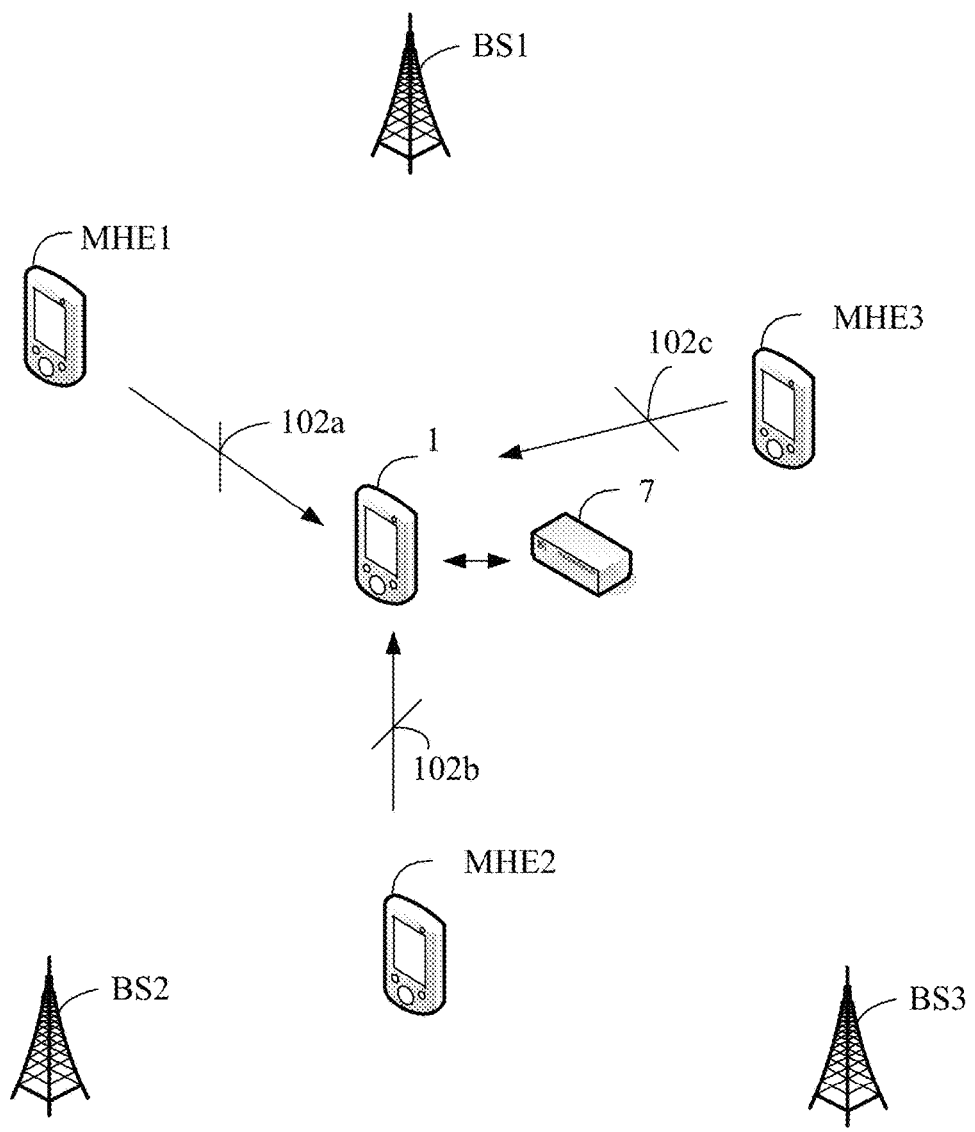
FIG. 7A is a schematic view illustrating how a location of a user equipment 1 is determined according to a fourth embodiment of the present invention.

It shall be appreciated that, in this embodiment, the main mobile hotspot equipment 7 also receives the measurement request message 702 transmitted by the user equipment 1 and transmits back a probe response signal 304 to the user equipment 1. Thus, when there is a relative displacement between the main mobile hotspot equipment 7 and the user equipment 1 during the time interval (i.e., when the strength of the probe response signal 304 measured by the user equipment 1 from the main mobile hotspot equipment 7 varies with the time), the backhaul device 8 may also establish a path loss attenuation model according to the received signal information generated based on the measured received signal strength from the main mobile hotspot equipment 7 so as to obtain the field model in the indoor space. On the other hand, from the viewpoint of the main mobile hotspot equipment 7, the transceiver 71 of the main mobile hotspot equipment 7 receives a measurement request message 702 via the backhaul network 8 and transmits the measurement request message 702 to the user equipment 1 so that the probe request signal 302 is broadcasted by the user equipment 1, as shown in FIG. 7A.

Figure 5B:
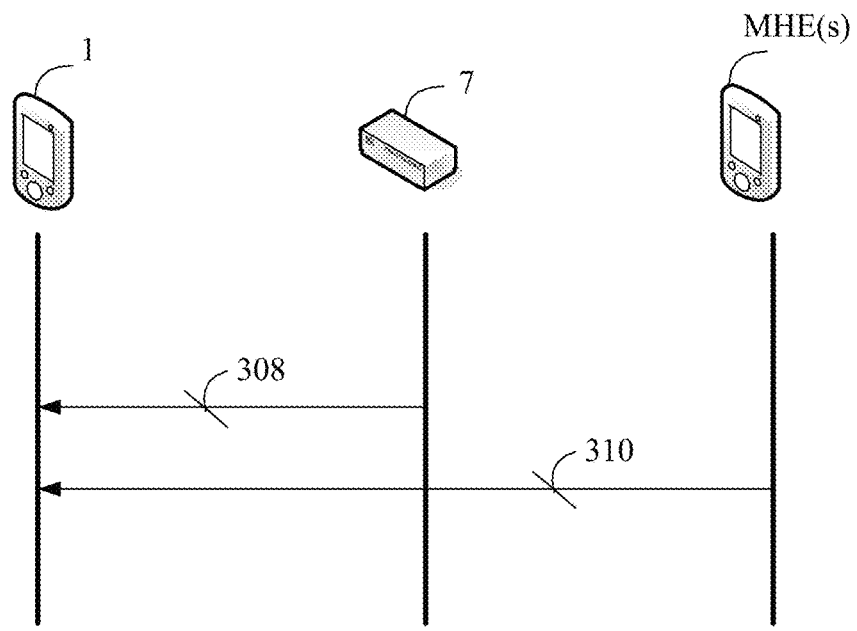

In another embodiment, as shown in FIG. 5B, after the measurement request message 702 is received from the backhaul device 8 via the main mobile hotspot equipment 7, the user equipment 1 measures a beacon signal 308/310 (i.e., a wireless signal 102) transmitted by each surrounding mobile hotspot equipment. Thereby, the user equipment 1 can obtain received signal information through measuring the beacon signal 308/310. The beacon signal 310 transmitted by each surrounding mobile hotspot equipment carries a service set identifier (SSID), so the user equipment 1 can obtain the identity of the surrounding mobile hotspot equipment from the beacon signal 310.

A third embodiment of the present invention is shown in FIG. 2, FIG. 4 and FIGS. 6A~6D. In this embodiment, how the processor of the backhaul device 8 establishes a path loss model according to the received signal information will be described thoroughly. As described previously, the user equipment 1 continuously measures signal strengths of wireless signals 102a, 102b, 102c transmitted by the surrounding mobile hotspot equipments MHE1, MHE2, MHE3 at a plurality of time points, and loads the measured received signal information and the identity of the corresponding surrounding mobile hotspot equipment into the measurement response message 104. Then, the user equipment 1 transmits the measurement response message 104 to the backhaul device 8 via the main mobile hotspot equipment 7. Once the backhaul device 8 receives the identities and the corresponding received signal information of the surrounding mobile hotspot equipments MHE1, MHE2, MHE3, the backhaul device 8 would begin to analyze the received signal information to establish the field model of the indoor space.

In detail, the following four stages are executed by the backhaul device 8 to establish the field model of the indoor space. Because the network interface 83 of the backhaul device 8 continuously receives measurement response messages 104 during a time interval, a plurality of signal measurement data corresponding to this time interval can be obtained by the network interface 83 of the backhaul device 8 from the received signal information comprised in the measurement response messages 104.

Figure 6A:
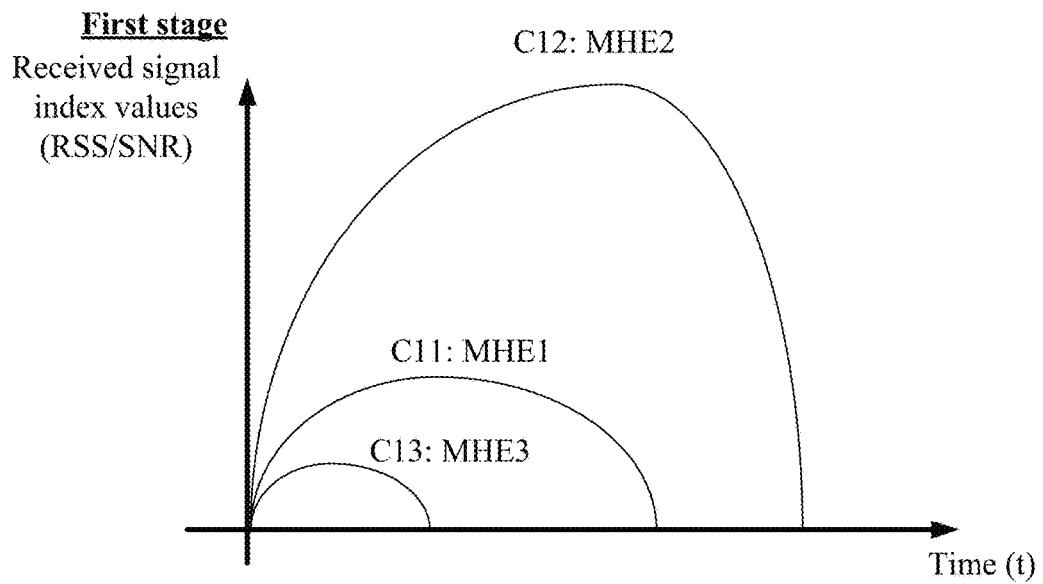
FIGS. 6A-6D are schematic views of a method for establishing a path loss model according to the third embodiment of the present invention.

At the first stage, the backhaul device 8 collects the signal measurement data corresponding to the plurality of surrounding mobile hotspot equipments from the user equipment 1 during the time interval. As shown in the graph of FIG. 6A, the horizontal axis represents the measurement time points ("time (t)") and the vertical axis represents the received signal index ("received signal index (RSS/SNR)"). Specifically, the curves C11, C12, C13 represent changes in received signal indices of the surrounding mobile hotspot equipments MHE1, MHE2, MHE3 respectively during the time interval. The received signal index may be a received signal strength (RSS) value or a signal to noise ratio (SNR) value. For example, the curve C11 represents the received signal indices obtained by the user equipment 1 through measuring wireless signals 102a transmitted from the surrounding mobile hotspot equipment MHE1 at different time points; the curve C12 represents the received signal indices obtained by the user equipment 1 through measuring wireless signals 102b transmitted from the surrounding mobile hotspot equipment MHE2 at different time points; the curve C13 represents the received signal indices obtained by the user equipment 1 through measuring wireless signals 102c transmitted from the surrounding mobile hotspot equipment MHE3 at different time points.

At the second stage, the time as the horizontal axis in FIG. 6A is converted into the sample. That is, the same number of samples are retrieved from the signal measurement data corresponding to each surrounding mobile hotspot equipment respectively, so the curves C21, C22, C23 in FIG. 6B have the same number of samples as each other. Specifically, if the surrounding mobile hotspot equipments MHE1, MHE2, MHE3 have the same moving speed and the user equipment 1 uses the same measurement frequency for the surrounding mobile hotspot equipments MHE1, MHE2, MHE3 (e.g., all being once per 100 ms, although it is not limited to this), then it can be clearly known from FIG. 2 and FIG. 6A that, because the movement paths P1, P2 of the surrounding mobile hotspot equipments MHE1, MHE2 in the signal coverage SC are longer than the movement path P3 of the surrounding mobile hotspot equipment MHE3, the signal measurement data obtained by the user equipment 1 from the surrounding mobile hotspot equipments MHE1 and MHE2 are more than those obtained by the user equipment 1 from the surrounding mobile hotspot equipment MHE3.

Figure 6B:
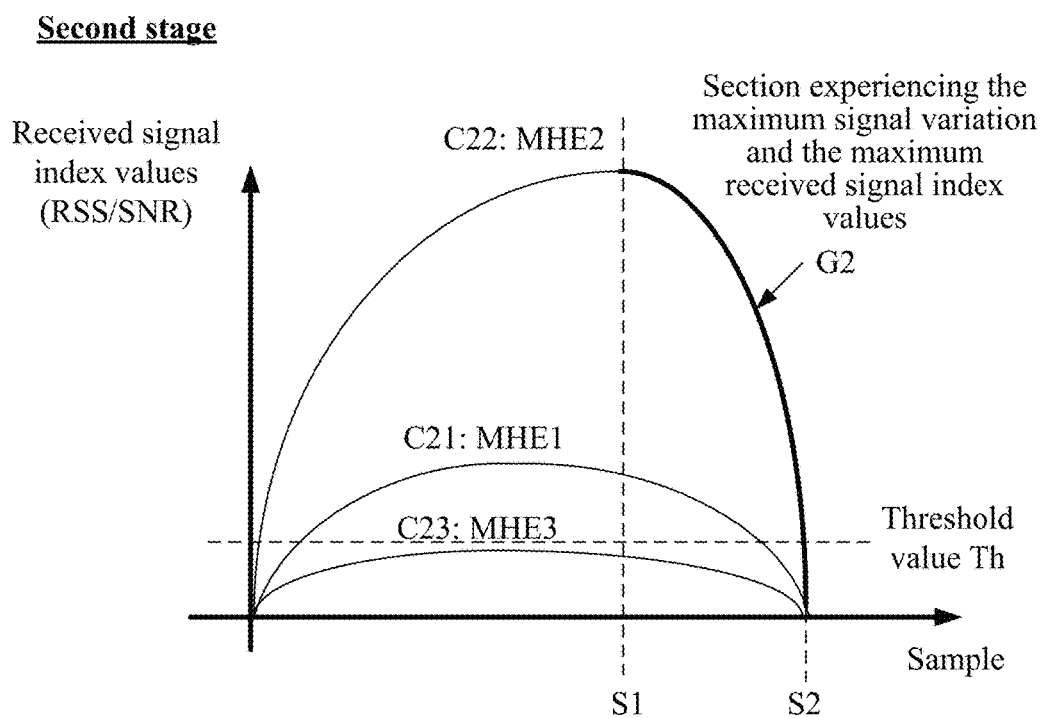

For example, assuming that the original curve C11 is comprised of 500 pieces of signal measurement data, the original curve C12 is comprised of 400 pieces of signal measurement data, and the original curve C13 is comprised of 300 pieces of signal measurement data. Then in the stage 2, the backhaul device 8 takes the same number of samples (e.g., 100 pieces of signal measurement data) from the 500 pieces of signal measurement data, the 400 pieces of signal measurement data and the 300 pieces of signal measurement data respectively to form the curves C21, C22, C23. Therefore, the curves C21, C22, C23 in FIG. 6B are all comprised of 100 pieces of signal measurement data (i.e., S2 represents the $100^{th}$ sample retrieved).

Next, the backhaul device 8 chooses the best one from the curves C21, C22, C23 as a basis to establish a path loss model. Specifically, the backhaul device 8 may choose a curve whose received signal indices are higher than a preset threshold value Th. As shown in FIG. 6B, each received signal index on the curve C23 is smaller than the threshold value Th, so the backhaul device 8 can only choose one of the curves C21, C22 as the basis for establishing the path loss model. Then, the backhaul device 8 chooses one of the curves C21, C22, which exhibits a larger signal variation (i.e., a larger variation in received signal indices), as the basis for establishing the path loss model (here, the curve 22 is chosen). Finally, the backhaul device retrieves a plurality of critical signal measurement data, i.e., the signal measurement data corresponding to the G2 section in FIG. 6B (i.e., signal measurement data corresponding to a specific time interval during the time interval), from the signal measurement data according to the received signal indices and the signal variation corresponding to the curve C22.

Figure 6C:
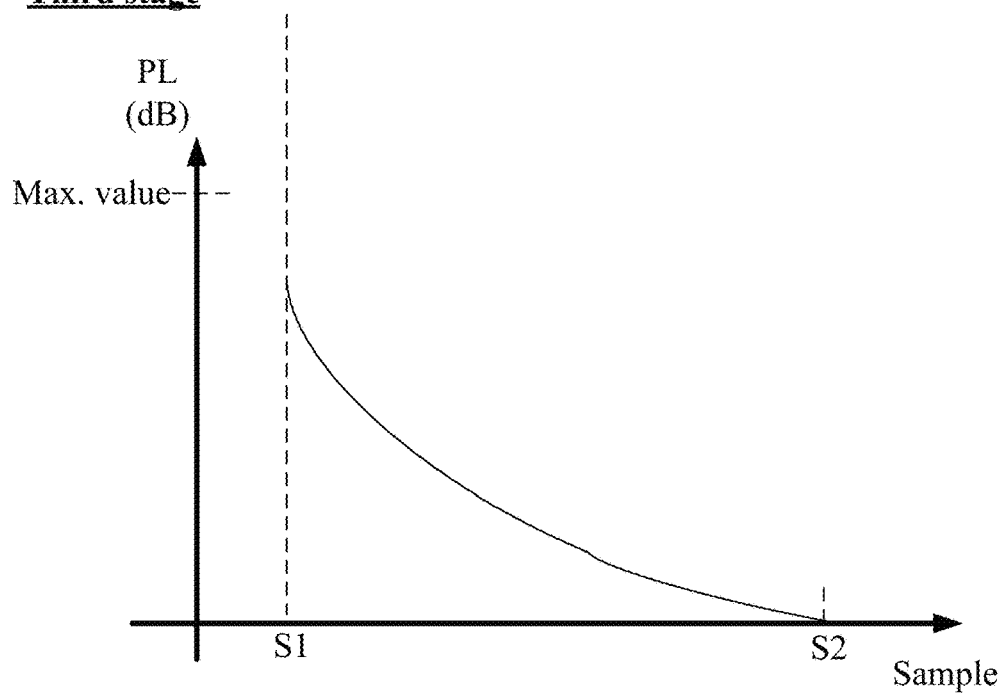

Thereafter, at the third stage (as shown in FIG. 6C), the backhaul device 8 transforms the G2 section in the curve C22 into an attenuation power curve. Specifically, the backhaul device 8 may obtain a received power value Pr from the received signal indices and obtains a transmit power value Pt from the transmit power defined in the WLAN specification, and according to an equation PL=Pt−Pr, express the G2 section in the form of an attenuation power value PL as shown in FIG. 6C. It shall be appreciated that, the attenuation power value PL in FIGS. 6C~6D are represented in units of dB, but the unit thereof is not intended to limit the present invention.

Figure 6D:
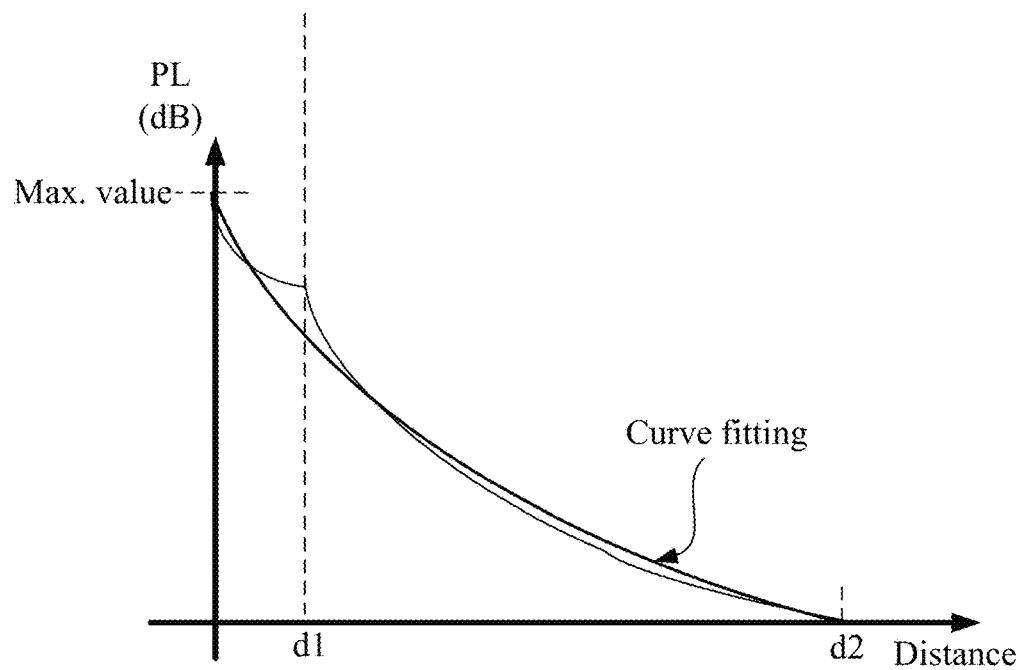

Finally at the fourth stage as shown in FIG. 6D, the backhaul device 8 transforms the relations between the attenuated power value PL and the samples into the relations between the attenuation power value PL and the distances, and further performs extrapolation and curve fitting according to the maximum attenuation power value PL defined in the WLAN specification to establish a path loss model. It shall be appreciated that, because how a path loss model is established through the operations of the aforesaid first stage to the fourth stage will be readily appreciated by those of ordinary skill in the art, this will not be detailed herein.

In other embodiments, the backhaul device 8 may also directly choose the curve C22 which has the maximum received signal indices (RSS/SNR) and a maximum signal variation in FIG. 6B without referring to the preset reference index threshold value Th, and retrieve a plurality of critical signal measurement data (i.e., the G2 section) from the signal measurement data to establish the path loss model according to the critical signal measurement data. Accordingly, the backhaul device 8 of this embodiment may choose the best signal measurement data from a plurality of pieces of received signal information to establish a path loss model. Additionally, in other embodiments, the backhaul device 8 may also retrieve critical signal measurement data from the signal measurement data corresponding to each of the surrounding mobile hotspot equipments respectively to establish a path loss model respectively.

As can be known from the above descriptions, the present invention can utilize a plurality of user equipments to continuously measure received signals of a plurality of surrounding mobile hotspot equipments in an indoor space and transmit the measured data to the backhaul device via mobile hotspot equipments to which the user equipments are connected. Thereby, the backhaul device can establish path loss models respectively according to the measured data through operations of the first stage to the fourth stage shown in FIGS. 6A~6D. Thus, by continuously establishing path loss models of areas in the indoor space and storing the path loss models into the path loss model database, an indoor field model can be established by the backhaul network.

Please refer to FIG. 1, FIGS. 3~4, FIG. 7 and FIGS. 8A~8B for a fourth embodiment of the present invention, which further describes how the backhaul device 8 utilizes the field model established according to the present invention to determine the location of the user equipment 1 more precisely. As shown in FIG. 1 and FIGS. 3~4, when the user desires to locate his or her own location via the user equipment 1, the processor 13 of the user equipment 1 generates a location service request message 602 and enables the transceiver 11 to transmit the location service request message 602 to the backhaul device 8 via the main mobile hotspot equipment 7. Further speaking, as shown in FIG. 7A, the user equipment 1 which is to perform the location service via the backhaul device 8 may measure wireless signals 102a, 102b, 102c transmitted by the surrounding mobile hotspot equipments MHE1, MHE2, MHE3 and generate received signal information in the aforesaid way. Finally, the processor 13 generates the location service request message 602 according to identities of the surrounding mobile hotspot equipments and the corresponding received signal information.

Therefore, the location service request message 602 transmitted by the user equipment 1 comprises a plurality of identities of a plurality of second surrounding mobile hotspot equipments and received signal information corresponding to each of the second surrounding mobile hotspot equipments. The backhaul device 8 receives the location service request message 602 from the user equipment 1 via the main mobile hotspot equipment 7. Thus, the backhaul device 8 can calculate real-time location information of the user equipment 1 according to the location service request message 602 and the path loss model database PLMDB and enable the network interface 83 of the backhaul device 8 to transmit a location service response message 620 having the real-time location information to the user equipment 1 via the main mobile hotspot equipment 7. It shall be noted that, the "surrounding mobile hotspot equipments" that are measured for purpose of establishing a field model may be either the same as or different from the "surrounding mobile hotspot equipments" that are measured for purpose of locating. In this embodiment, the surrounding mobile hotspot equipments MHE1, MHE2, MHE3 are used both for establishing the field model and for locating; however, the present invention is not limited to this scenario. In other scenarios, the "surrounding mobile hotspot equipments" that are measured for purpose of establishing the field model may be totally different from the "surrounding mobile hotspot equipments" that are measured for purpose of locating, or may be partly the same as the "surrounding mobile hotspot equipment" that are measured for purpose of locating.

It shall be noted that, the "surrounding mobile hotspot equipment 5" described in the first embodiment corresponds to the "first surrounding mobile hotspot equipment" described in the claims. Furthermore, the term "first" surrounding mobile hotspot equipment described herein represents the surrounding mobile hotspot equipment used to assist in establishing the path loss model, while the term "second" surrounding mobile hotspot equipment represents the surrounding mobile hotspot equipment used to assist in locating. Therefore, the "first" surrounding mobile hotspot equipment used to assist in establishing the path loss model may be the same as or different from the "second" surrounding mobile hotspot equipment that is measured for purpose of locating. In this embodiment, the surrounding mobile hotspot equipments MHE1, MHE2, MHE3 are used to assist in both establishing the path loss model and locating. However, in other implementation scenarios, the "first" surrounding mobile hotspot equipment used to assist in establishing the path loss model may be totally different from the "second" surrounding mobile hotspot equipment used to assist in locating, or may be partly the same as the "second" surrounding mobile hotspot equipment used to assist in locating.

Further speaking, when the backhaul device 8 determines the location of the user equipment 1, it needs to utilize the location information of the surrounding mobile hotspot equipments MHE1, MHE2, MHE3 (also called "reference points") of the user equipment 1 to assist in determining location of the user equipment 1. The backhaul device 8 may obtain real-time location information of each of the surrounding mobile hotspot equipments MHE1, MHE2, MHE3 in various ways. For example, the backhaul device 8 may locate the surrounding mobile hotspot equipments MHE1, MHE2, MHE3 respectively in real time via surrounding base stations BS1, BS2, BS3. Because how the surrounding mobile hotspot equipments are located in real time can be appreciated by those of ordinary skill in the art, this will not be further described herein.

Figure 7B:
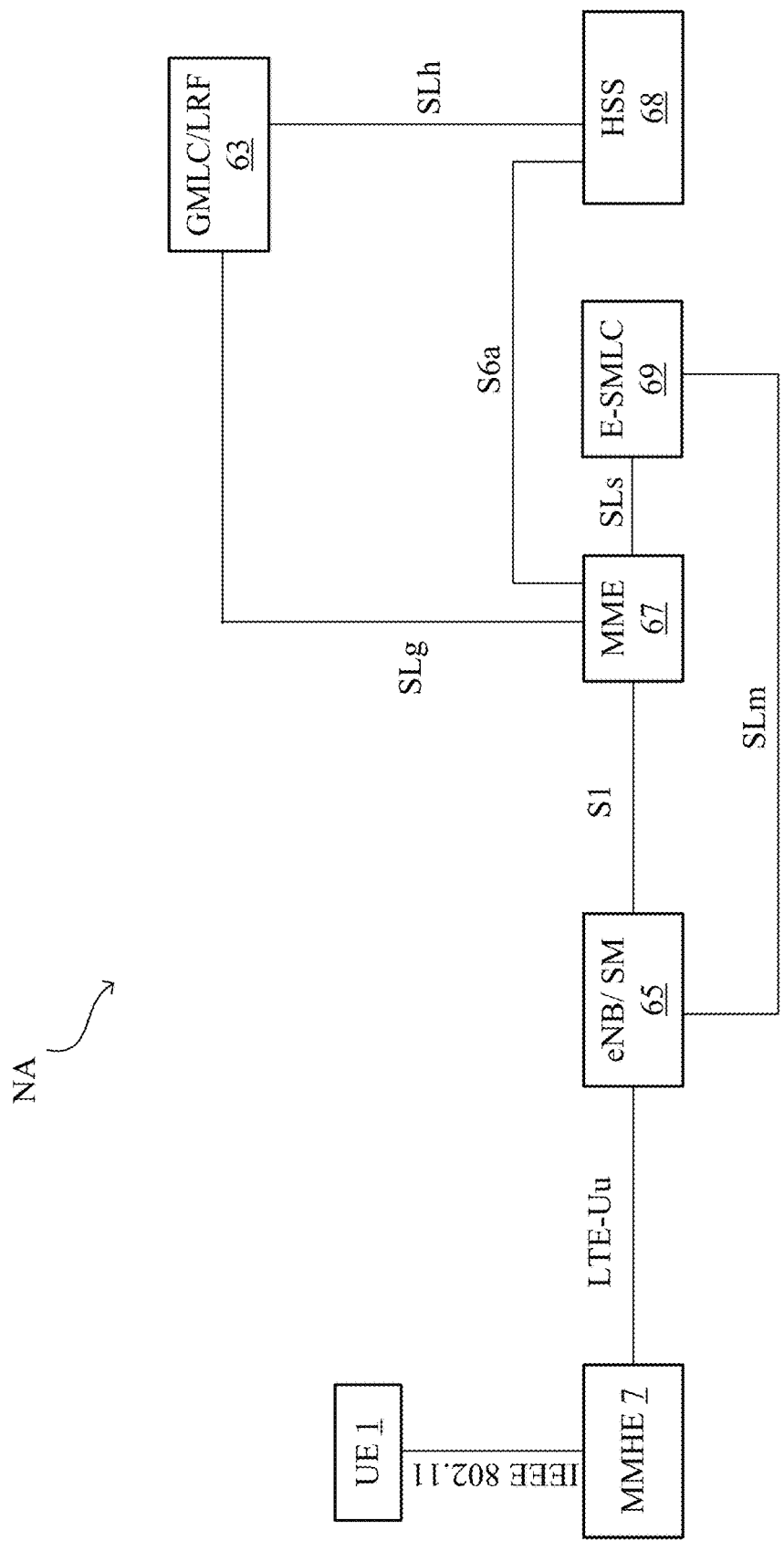
FIG. 7B is a schematic view of a network architecture NA according to the fourth embodiment of the present invention.

FIG. 7B is a schematic view of a network architecture NA. The network architecture NA comprises a user equipment 1, a main mobile hotspot equipment 7, a base station (eNB)/small cell (SM), a gateway mobile location center (GMLC)/location retrieval function (LRF) 63, a mobility management entity (MME) 67, a home subscriber server (HSS) 68 and an evolved serving mobile location center (E-SMLC) 69.

The user equipment 1 and the main mobile hotspot equipment 7 connect with each other via a WLAN conforming to the IEEE 802.11 specification. The main mobile hotspot equipment 7 and the base station/small cell 65 communicate with each other via an LTE-Uu interface. The base station/small cell 65 and the MME 67 communicate with each other via an S1 interface. The MME 67 and the GMLC/LRF 63 communicate with each other via an SLg interface. The MME 67 and the E-SMLC 69 communicate with each other via an SLs interface. The MME 67 and the HSS 68 communicate with each other via an S6a interface. The base station/small cell 65 and the E-SMLC 69 communicate with each other via an SLm interface.

Figure 8A:
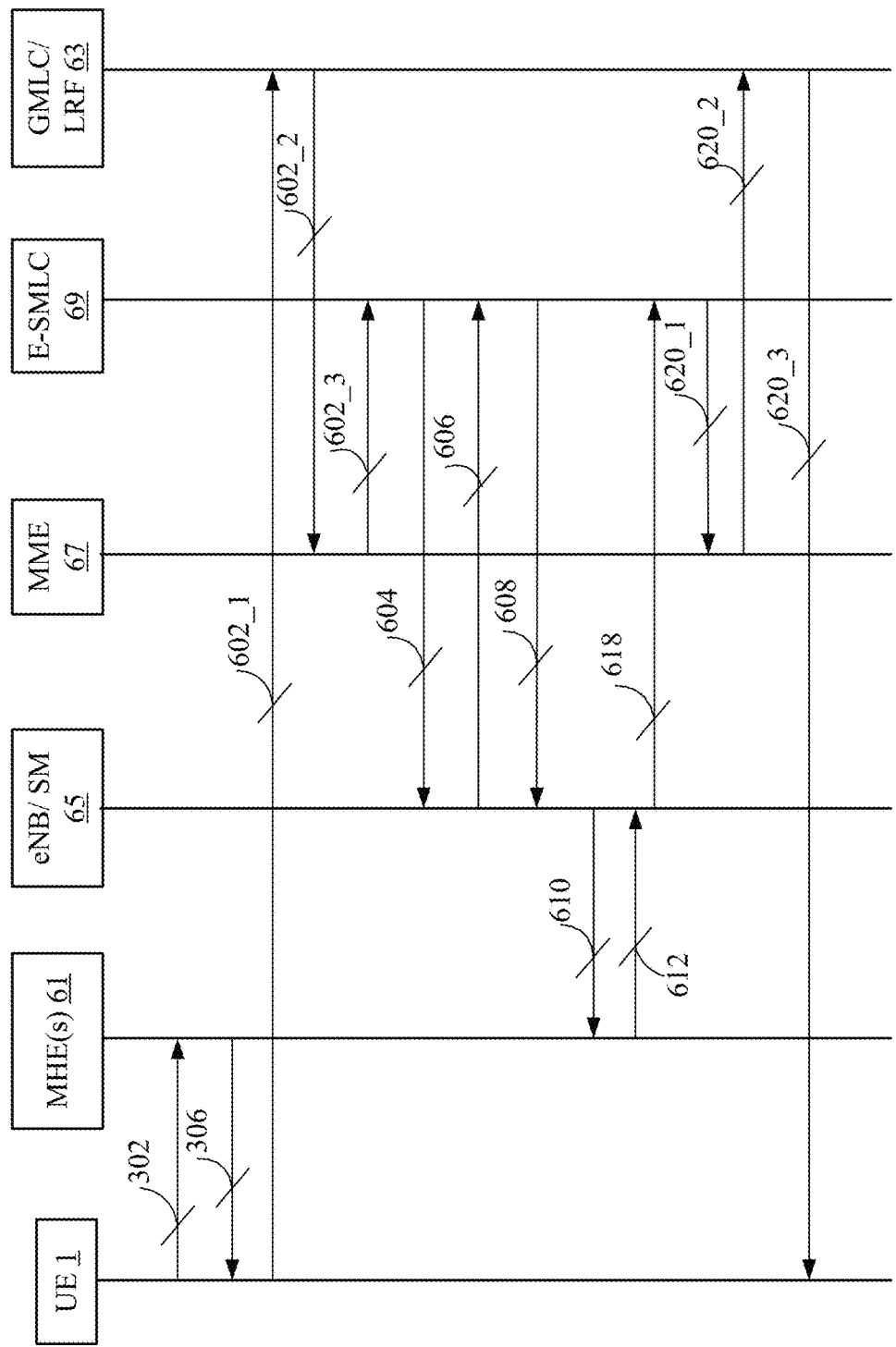
FIGS. 8A-8F are schematic views illustrating signal transmissions between a user equipment 1 and backhaul servers according to the fourth embodiment of the present invention.
Figure 8B:
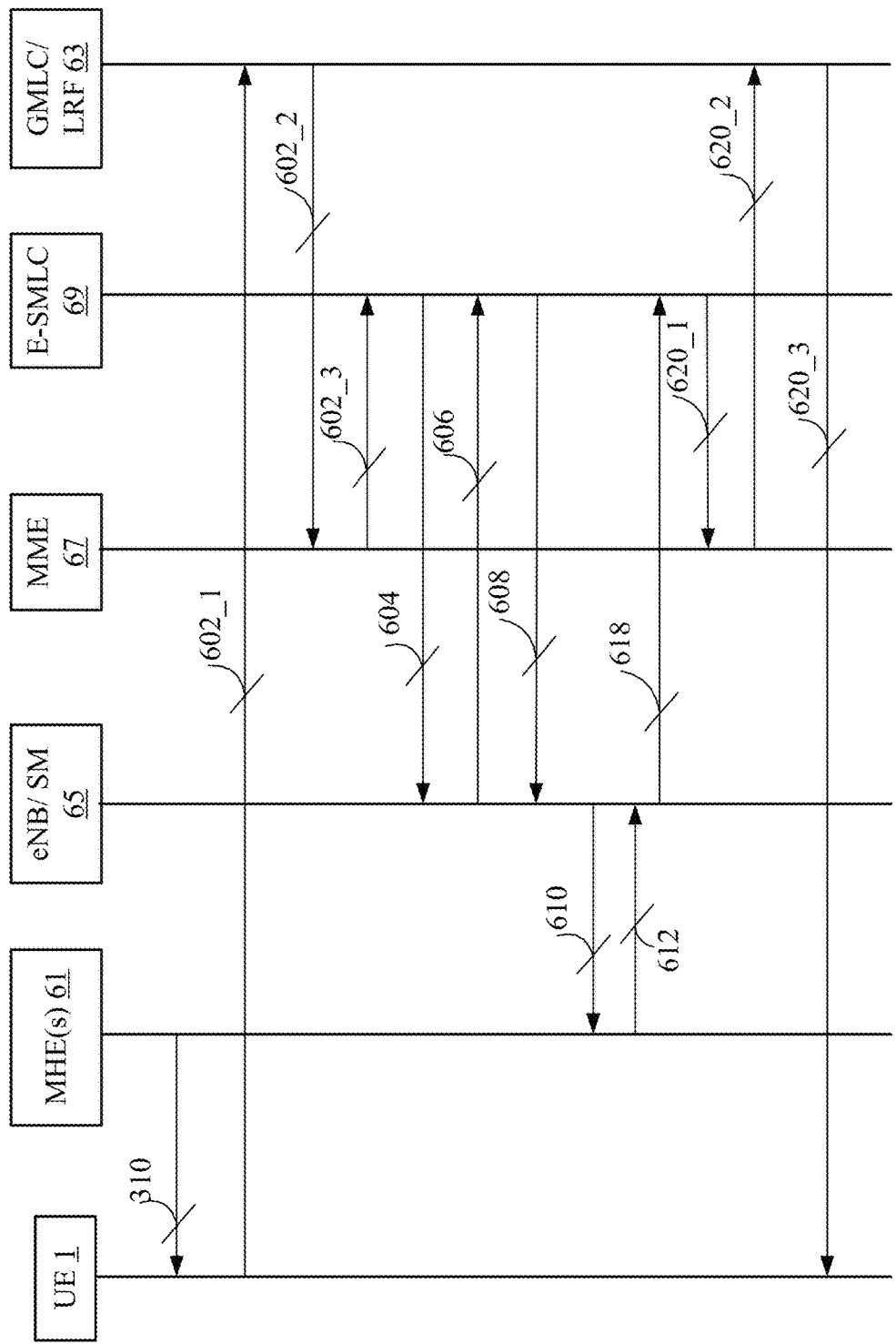

FIGS. 8A~8B depict a signal transmission process executed when location service is requested by the user equipment 1. In the scenario of FIG. 8A, the user equipment 1 may register with the backhaul network, so the communication between the user equipment 1 and the backhaul network does not need further processing by the main mobile hotspot equipment and the base station. In other words, the main mobile hotspot equipment and the base station only act to forward signals in this scenario. FIG. 8A differs from FIG. 8B only in that, the wireless signal 102 transmitted by each of the surrounding mobile hotspot equipments is a probe response signal 306 in FIG. 8A, while the wireless signal 102 transmitted by each of the surrounding mobile hotspot equipments is a beacon signal 310 in FIG. 8B.

First, the user equipment 1 which is to perform a location service transmits a probe request message 302 to at least three surrounding mobile hotspot equipments MHEs (e.g., MHE1, MHE2, MHE3). As described above, the probe request message 302 may be transmitted to the surrounding mobile hotspot equipments MHEs through broadcasting. Then, the user equipment 1 can receive probe response messages 306 transmitted by the surrounding mobile hotspot equipments MHEs to measure received signal information of each of the probe response messages 306. The user equipment 1 loads a plurality of identities of a plurality of surrounding mobile hotspot equipments and received signal information corresponding to each of the surrounding mobile hotspot equipments into a location service request message 602_1 and transmits the location service request message 602_1 to the GMLC/LRF 63. Next, the GMLC/LRF 63 transmits a location service request message 602_2 to the MME 67 which, in turn, transmits a location service request message 602_3 to the E-SMLC 69.

Afterwards, the E-SMLC 69 transmits a location information request message 604 to a base station/small cell 65 according to the received location service request message 602_3 so that the base station/small cell 65 transmits back a location information response message 606 to the E-SMLC 69. After receiving the location information response message 606, the E-SMLC 69 transmits a measurement request message 608 to the base station/small cell 65. Accordingly, the base station/small cell 65 transmits a bandwidth allocation message 610 to each of the surrounding mobile hotspot equipments 61 according to the measurement request message 608 so that a sounding reference signal (SRS) 612 is transmitted by each of the surrounding mobile hotspot equipments 61.

Thus, each of the surrounding mobile hotspot equipments 61 can transmit the sounding reference signal 612 to the base station/small cell 65. Then, the base station/small cell 65 transmits a measurement response message 618 to the E-SMLC 69 so that the E-SMLC 69 determines the location of the user equipment 1 according to the measurement response message 618 and transmits a location service response message 620_1 to the MME 67. Finally, the MME 67 transmits the location service response message 620_2 to the GMLC/LRF 63 so that the GMLC/LRF 63 transmits a location service response message 620_3 to the user equipment 1 to inform the user equipment 1 of the location thereof.

It shall be appreciated that, FIG. 8B differs from FIG. 8A only in that, the user equipment 1 in FIG. 8B directly measures the beacon signal 310 transmitted by the surrounding mobile hotspot equipments 61 to obtain the location of the user equipment 1. Because how the aforesaid description is applied to this implementation scenario can be known by those of ordinary skill in the art, this will not be described herein.

In another embodiment, the processor 13 of the user equipment 1 generates a location measurement response message and enables the transceiver 11 to transmit the location measurement response message to the backhaul device 8 via the main mobile hotspot equipment 7. The location measurement response message comprises a plurality of identities of a plurality of second surrounding mobile hotspot equipments and received signal information corresponding to each of the second surrounding mobile hotspot equipments so that the backhaul device 8 calculates real-time location information of the user equipment 1 according to the location measurement response message and the path loss model database PLMDB. Accordingly, the backhaul device 8 transmits a location service response message including the real-time location information to the user equipment 1 via the main mobile hotspot equipment 7.

Figure 8C:
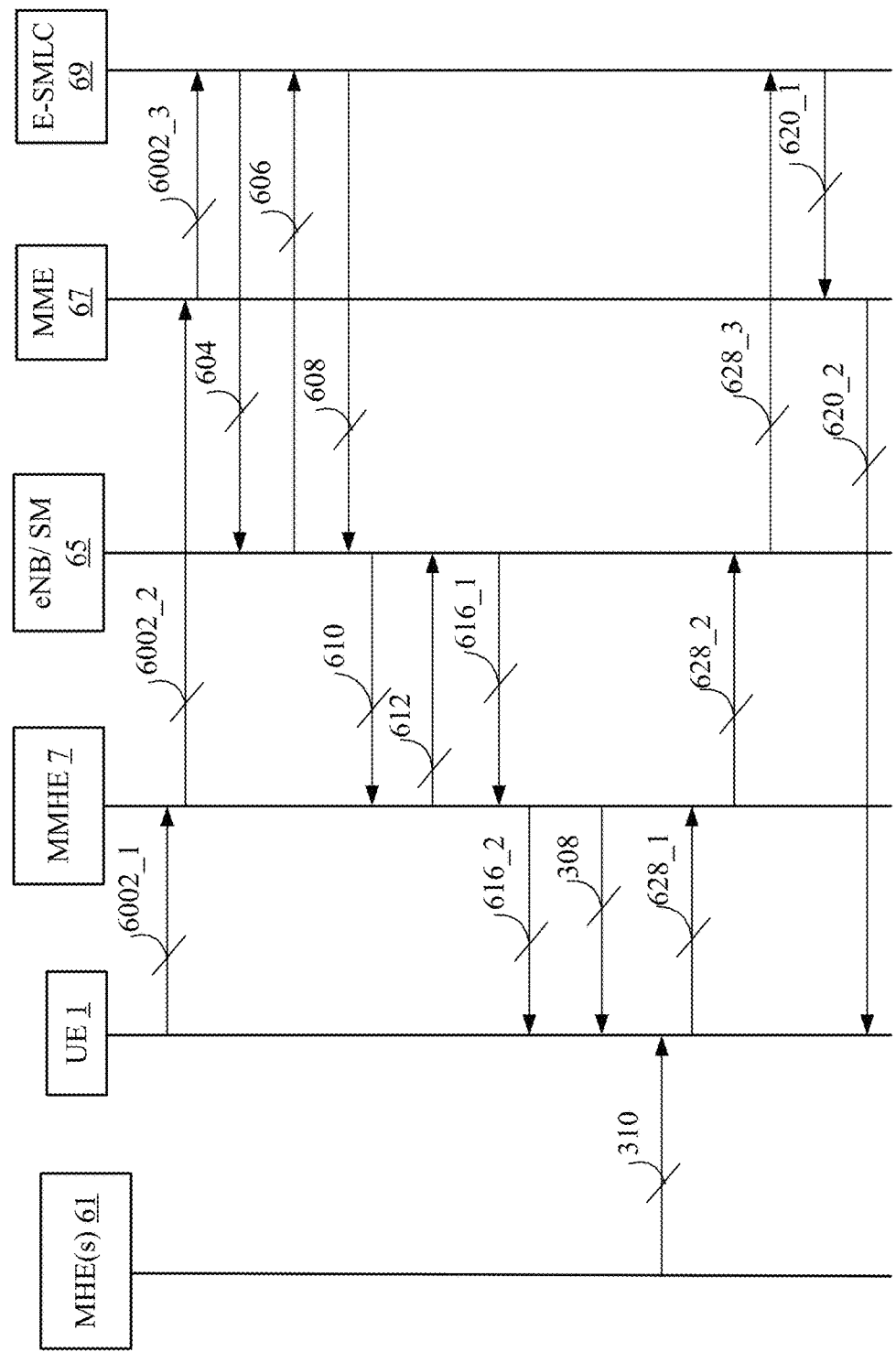
Figure 8D:
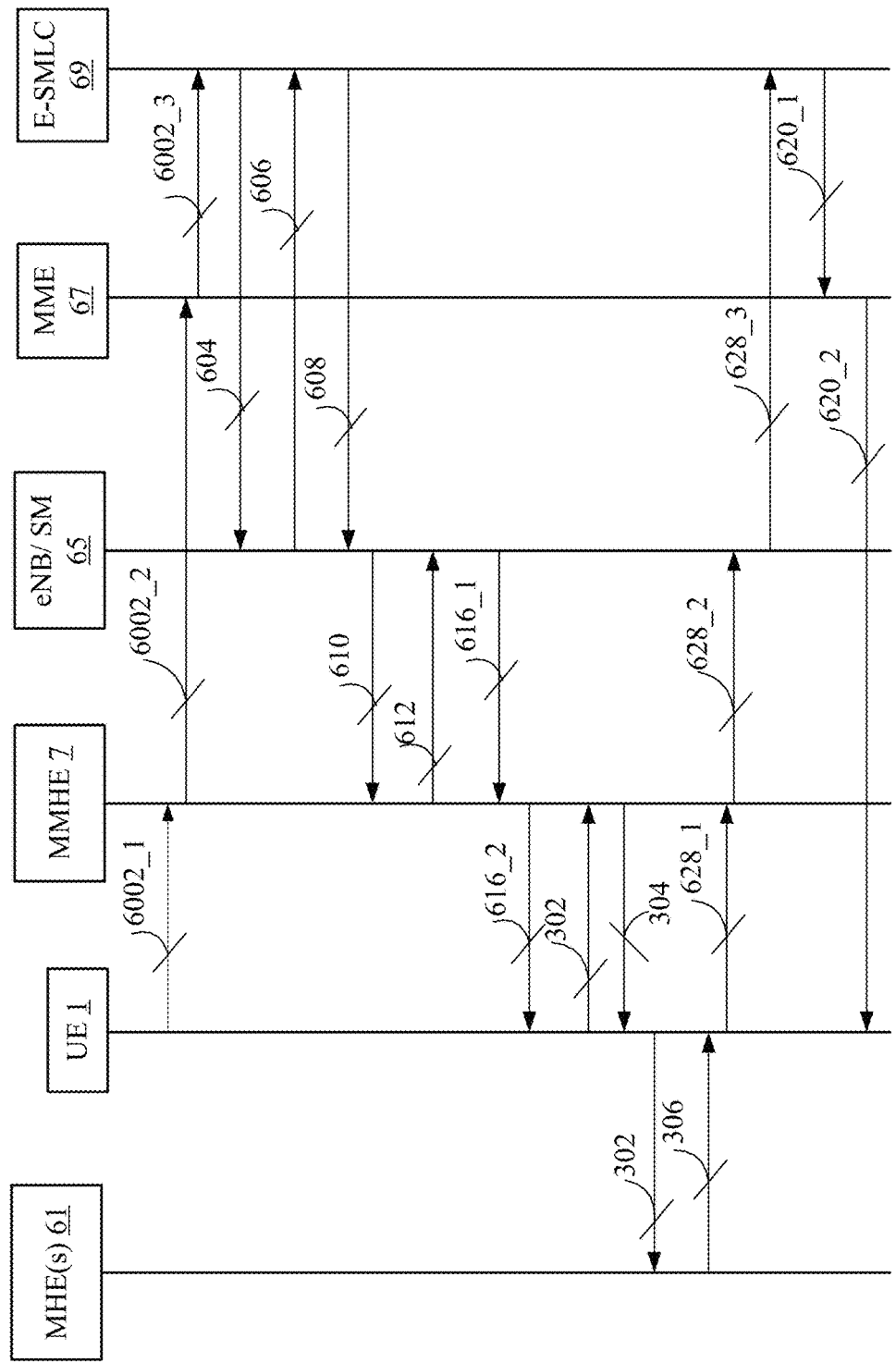
Figure 8E:
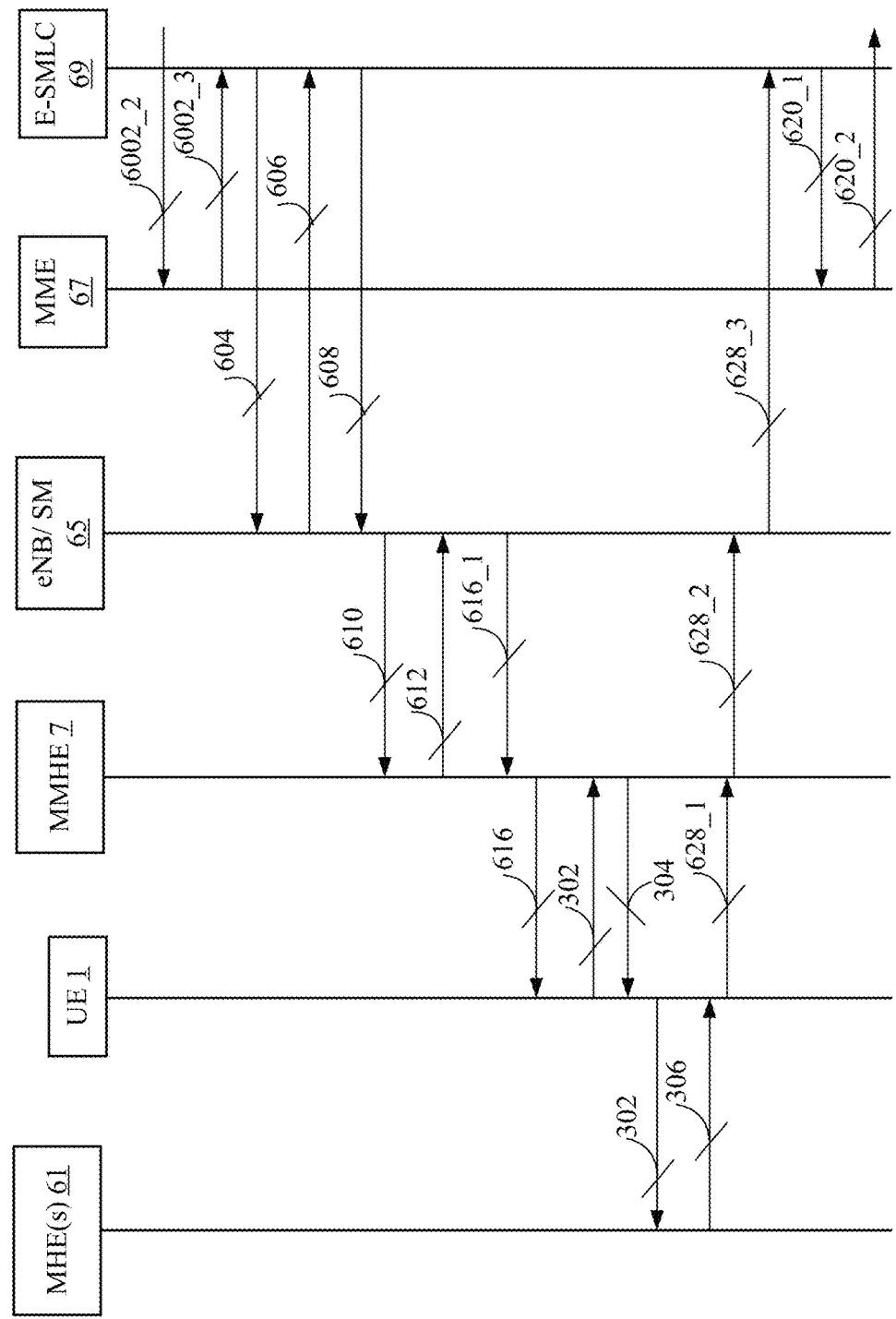
Figure 8F:
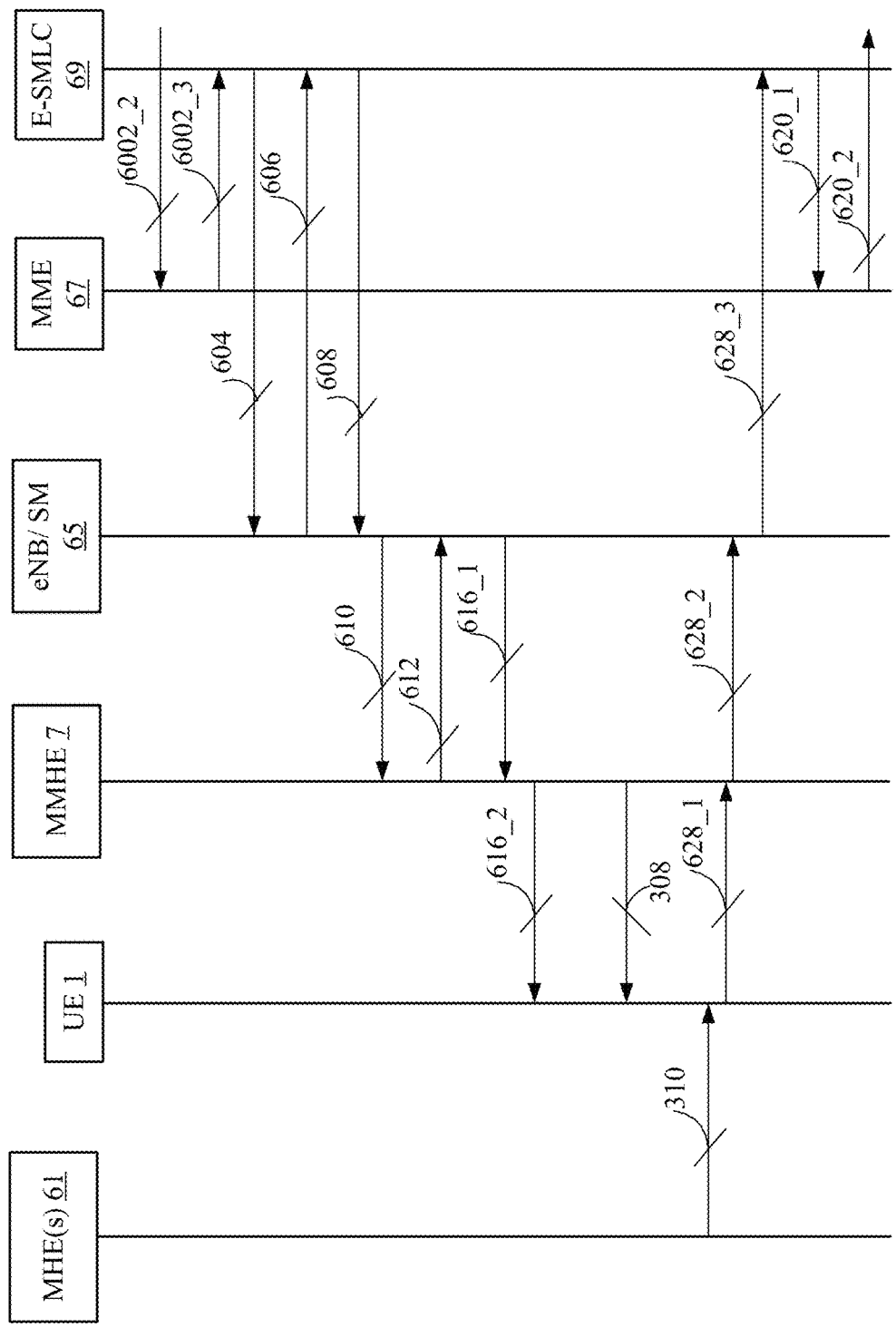

Further speaking, FIGS. 8C~8D depicts a signal transmission process executed when locating is requested by the user equipment 1. In this scenario, first the user equipment 1 needs to request the location service from the main mobile hotspot equipment 7 and then the main mobile hotspot equipment 7 requests the location service from the backhaul network. The wireless signal 102 transmitted by each of the surrounding mobile hotspot equipments is a beacon signal 310 in FIG. 8C and is a probe response signal 304 in FIG. 8D. Since the implementation scenario of FIG. 8D can be known by those of ordinary skill in the art based on the following description of FIG. 8C, only FIG. 8C will be described hereinbelow.

First, the user equipment 1 which is to perform a location service transmits a location service request message 6002_1 to the main mobile hotspot equipment 7, and then the main mobile hotspot equipment 7 transmits a location service request message 6002_2 to an MME 67 so that the MME 67 transmits a location service request message 6002_3 to the E-SMLC 69. Afterwards, the E-SMLC 69 transmits a location information request message 604 to the base station/small cell 65 according to the received location service request message 6002_3 so that the base station/small cell 65 transmits back a location information response message 606 to the E-SMLC 69. After receiving the location information response message 606, the E-SMLC 609 transmits a measurement request message 608 to the base station/small cell 65. Accordingly, the base station/small cell 65 allocates a bandwidth according to the measurement request message 608 and transmits a bandwidth allocation message 610 to the main mobile hotspot equipments 7 so that a sounding reference signal (SRS) 612 is transmitted by the main mobile hotspot equipments 7 to the base station/small cell 65.

Next, the base station/small cell 65 transmits a measurement request message 616_1 to the main mobile hotspot equipment 7 which, in turn, transmits a measurement request message 616_2 to the user equipment 1. After receiving the measurement request message 616_2, the user equipment 1 measures the beacon signals 308/310 transmitted by the surrounding mobile hotspot equipments 61 and the main mobile hotspot equipment 7 respectively to generate received signal information according to the measurement results. Then, the user equipment 1 loads a plurality of identities of the surrounding mobile hotspot equipments and received signal information corresponding to each of the surrounding mobile hotspot equipments into a location measurement response message 628_1 and transmits the location measurement response message 628_1 to the main mobile hotspot equipment 7. Afterwards, the main mobile hotspot equipment 7 transmits a location measurement response message 628_2 to the base station eNB or small cell 65. The base station eNB or small cell 65 then transmits a location measurement response message 628_3 to the E-SMLC 69. Accordingly, the E-SMLC 69 can determine the real-time location of the user equipment 1 according to the location measurement response message 620_1 and transmit a location service response message 620_1 to the MME 67 so that the MME 67 transmits a location service response message 620_2 to the user equipment 1. Thereby, the user equipment 1 can know its own location.

In other implementations as shown in FIG. 6E~6F, another equipment (not shown) which desires to know the location of the user equipment 1 can transmit a location service request message 6002_2 to the MME 67 to request for the location information of the user equipment 1. Therefore, different from the implementation scenarios of FIGS. 6C~6D, the location service request message 6002_2 is transmitted from the another equipment to the MME 67 and the MME 67 finally transmits the location service response message 620_2 to the another equipment so that the another equipment can know the location of the user equipment 1. It shall be appreciated that, transmissions of other messages or signals in FIGS. 6E~6F are just the same as those of FIGS. 6C~6D, so they will not be further described herein. Similarly, FIG. 6E differs from FIG. 6F only in that, the wireless signal 102 transmitted by each of the surrounding mobile hotspot equipments is a probe response signal 306 in FIG. 6E but is a beacon signal 310 in FIG. 6F. Since the implementation scenarios of FIG. 6E and FIG. 6F can be known by those of ordinary skill in the art based on the above descriptions, they will not be further described herein.

Figure 9:
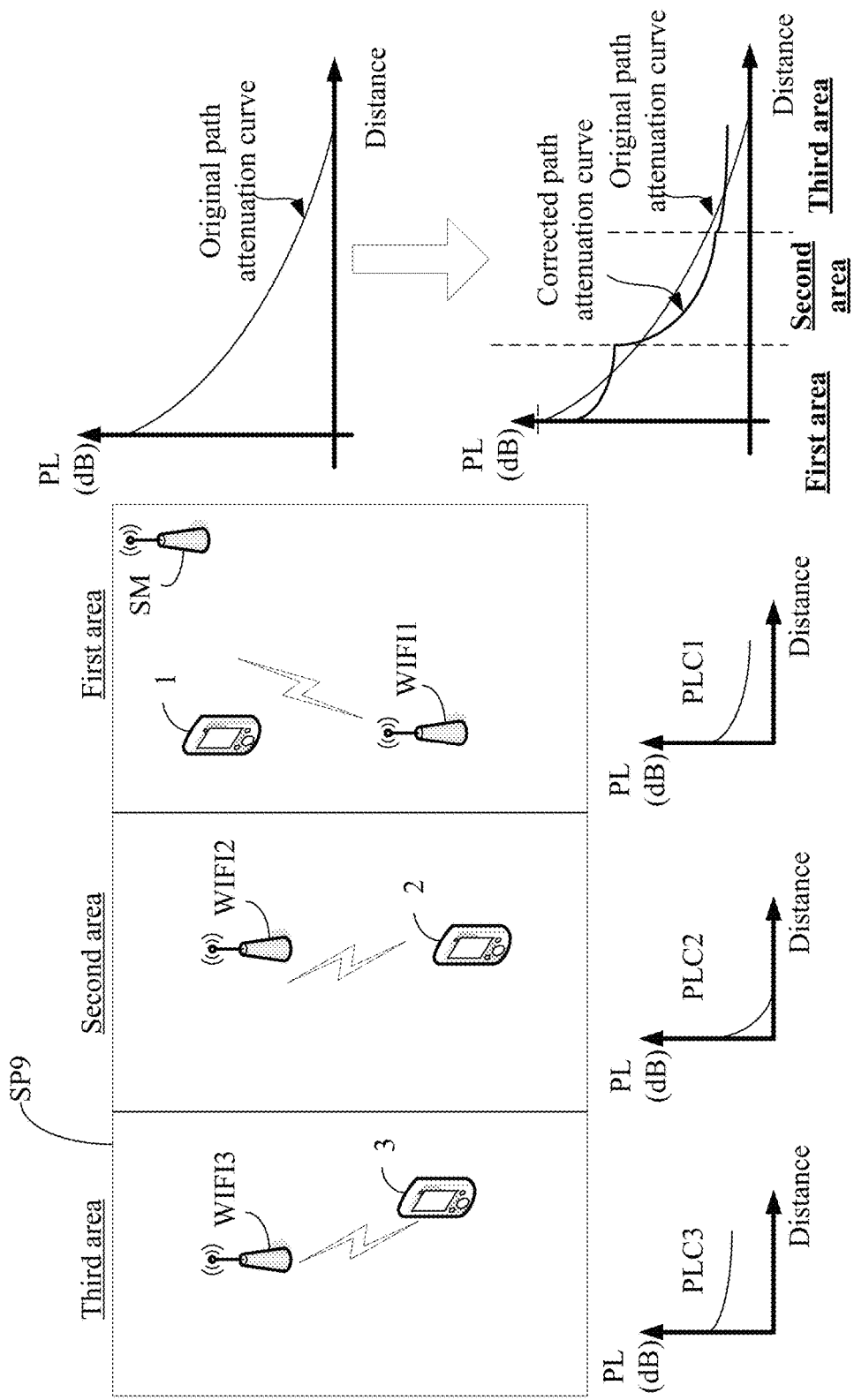
FIG. 9 illustrates an application according to a fifth embodiment of the present invention.

A fifth embodiment of the present invention relates to an application aspect. As shown in FIG. 9, the present invention may subdivide a space SP9 into different spaces (i.e., a first area, a second area, and a third area) and provide path loss curves PLC1, PLC2, PLC3 established for the first area, the second area and the third area to a small cell SM for use to correct the path loss curve of the space SP9. The original path loss curve of the small cell SM may be provided by the supplier of the small cell SM. However, actually the small cell SM is placed in a space SP9, so the actual path loss curve has a difference from the original path loss curve provided by the supplier. In the present invention, the path loss curve PLC1 of the first area, the path loss curve PLC2 of the second area and the path loss curve PLC3 of the third area will be established by using the user equipments 1, 2, 3 to measure variations in signal strength of a hotspot WIFI1, WIFI2, WIFI3 at different locations in each of the areas (the first area, the second area, and the third area) respectively.

Therefore, the backhaul device 8 can use the path loss curves PLC1, PLC2, PLC3 to correct a path loss curve of the small cell SM1. Further speaking, for the backhaul device 8, the locations of the hotspots WIFI1-WIFI3 and the small cell SM are already known, and boundaries of the first area, the second area and the third area may be determined according to the following conditions: (1) when received signal strengths received by the user equipment 1 from two surrounding hotspots (e.g., WIFI1 and WIFI2) are substantially equal to each other; and (2) when the received signal strength received by the user equipment 1 becomes attenuated abruptly, it can be determined that the user equipment 1 is currently located at a boundary of two areas. Thus, the backhaul device 8 can correct the path loss curve of the small cell SM according to the path loss curves measured in individual areas to obtain a more precise path loss curve of the small cell SM.

Figure 10:
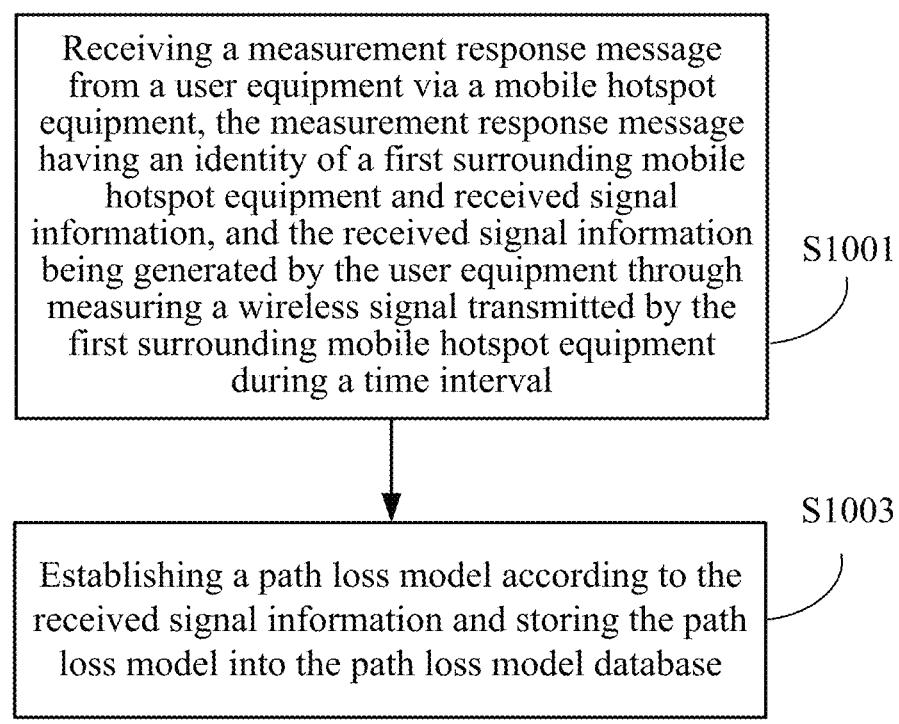
FIG. 10 is a flowchart diagram of a method for establishing a path loss model database according to a sixth embodiment of the present invention.

A sixth embodiment of the present invention is a method for establishing a path loss model database, a flowchart diagram of which is shown in FIG. 10. The method for establishing a path loss model database is executed by a backhaul device, e.g., the backhaul device 8 described in the first embodiment to the fourth embodiment. The backhaul device comprises a storage, a network interface and a processor. First, in the step S1001, the backhaul device receives a measurement response message from a user equipment via a mobile hotspot equipment. The measurement response message has an identity of a first surrounding mobile hotspot equipment and received signal information. The received signal information is generated by the user equipment through measuring a wireless signal during a time interval. The wireless signal is transmitted by the first surrounding mobile hotspot equipment. Then in the step S1003, the backhaul device establishes a path loss model according to the received signal information and stores the path loss model into the path loss model database.

In other embodiments, the method for establishing a path loss model database further comprises the following step of: generating a measurement request message and transmitting the measurement request message to the user equipment via the mobile hotspot equipment so that during the time interval, the user equipment measures the wireless signal transmitted by the first surrounding mobile hotspot equipment in response to the measurement request message.

In other embodiments, the method for establishing a path loss model database further comprises the following steps of: receiving a plurality of the measurement response message during the time interval, the received signal information in the measurement response messages is constructed by a plurality of signal measurement data; and retrieving a plurality of critical signal measurement data from the signal measurement data according to a received signal index value and a signal variation amount of the signal measurement data to establish the path loss model according to the critical signal measurement data. In an embodiment, the critical signal measurement data corresponds to a specific time interval within the time interval, the received signal index value of at least one of the critical signal measurement data is larger than a threshold value, and the signal variation amount of the critical signal measurement data is the largest among those of the signal measurement data.

In another embodiment, the critical signal measurement data corresponds to a specific time interval within the time interval, the received signal index value of one of the critical signal measurement data is the largest among those of the signal measurement data, and the signal variation amount of the critical signal measurement data is the largest among those of the signal measurement data.

In other embodiments, the method for establishing a path loss model database further comprises the following steps of: receiving a location measurement response message from the user equipment via the mobile hotspot equipment, the location measurement response message comprising a plurality of identities of a plurality of second surrounding mobile hotspot equipments and received signal information of each of the second surrounding mobile hotspot equipments corresponding to the user equipment; and calculating real-time location information of the user equipment according to the location measurement response message and the path loss model database, and transmitting a location service response message including the real-time location information to the user equipment via the mobile hotspot equipment.

In addition to the aforesaid steps, the method for establishing a path loss model database of this embodiment can also execute all the operations and have all corresponding functions set forth in the first embodiment to the fifth embodiment. How this embodiment executes these operations and have these functions will be readily appreciated by those of ordinary skill in the art based on the explanation of the first embodiment to the fifth embodiment, and thus will not be further described herein.

Figure 11:
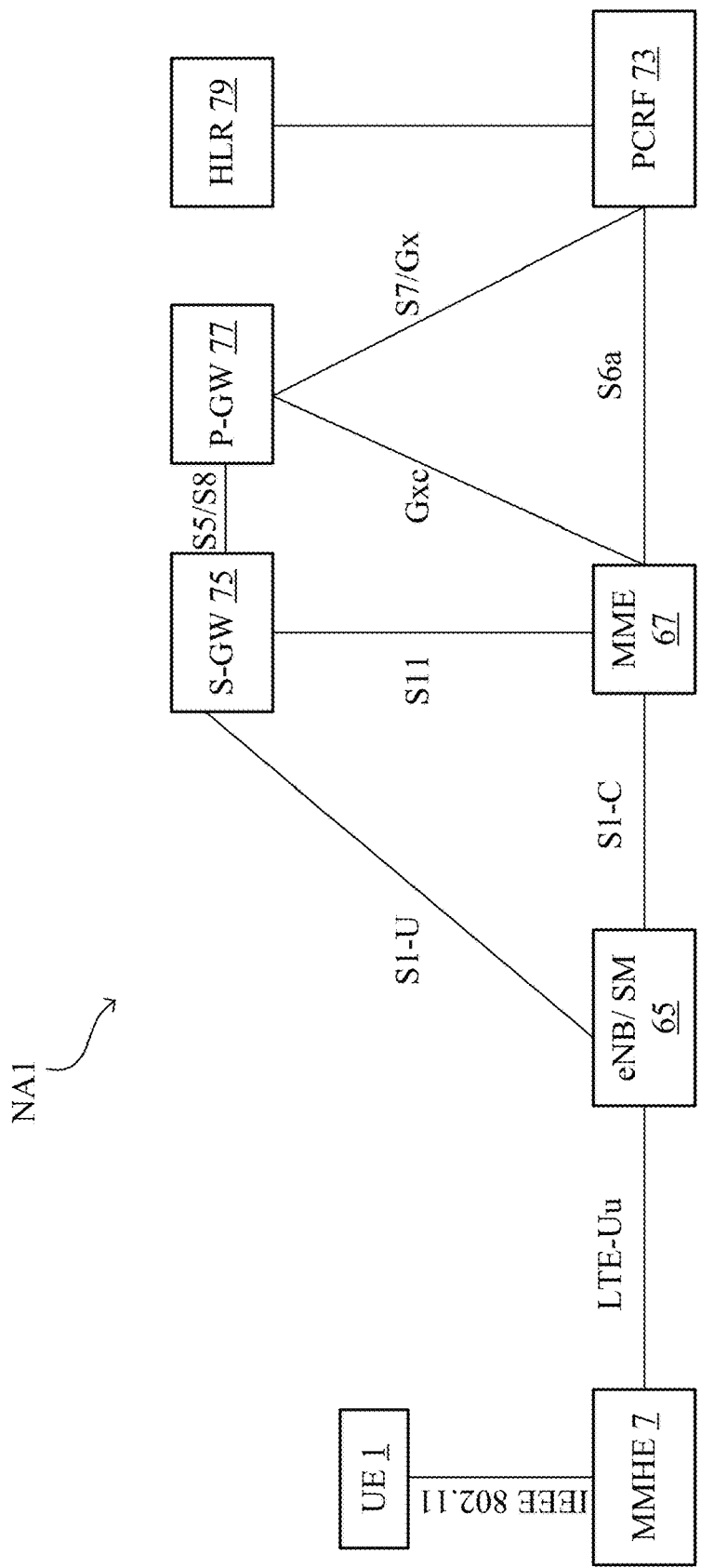
FIG. 11 is a schematic view of a network architecture NA1 according to a seventh embodiment.
Figure 12:
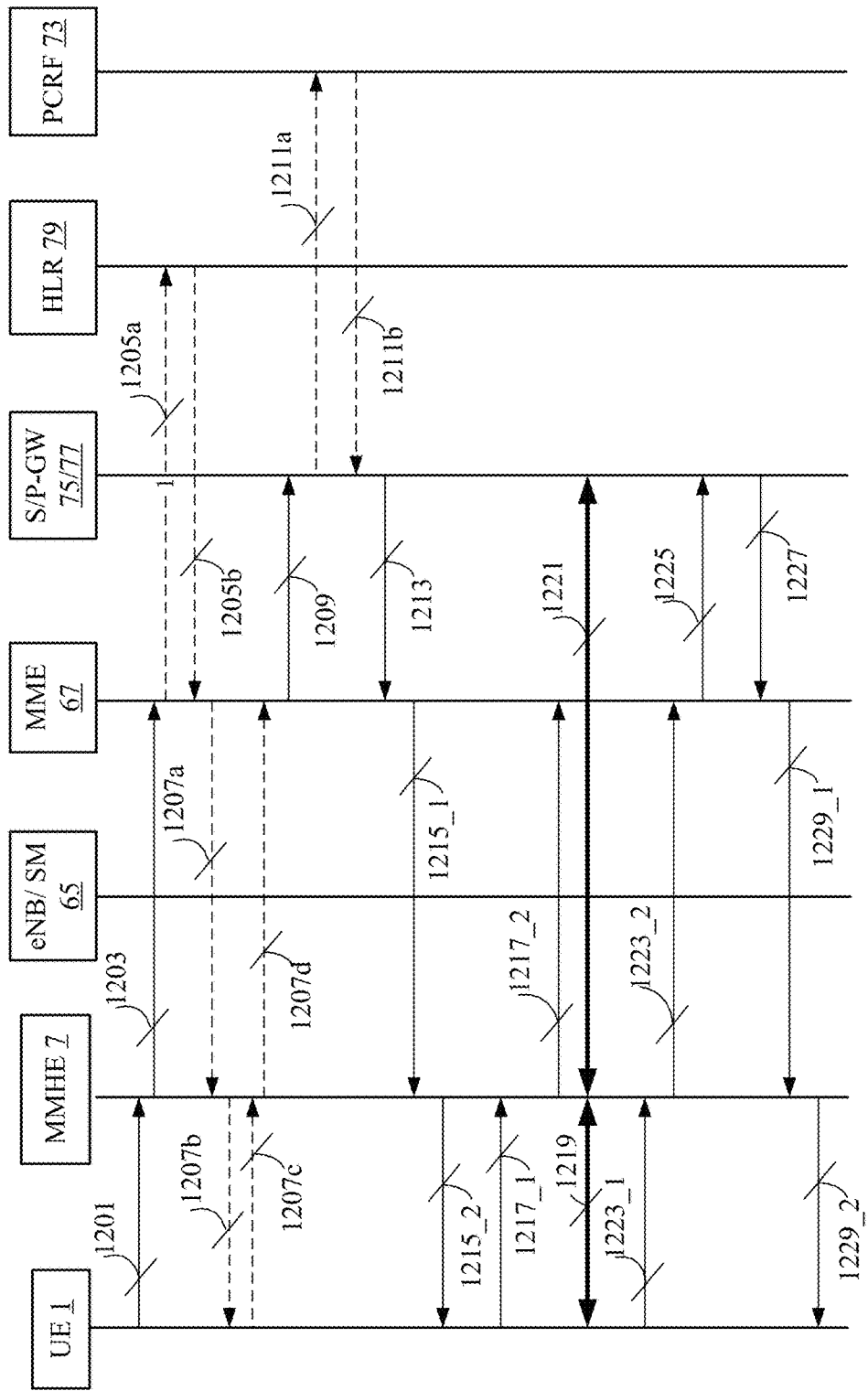
FIG. 12 is a schematic view illustrating a signal transmission process under the network architecture NA1 according to the seventh embodiment of the present invention.

A seventh embodiment of the present invention is shown in FIG. 11 and FIG. 12. FIG. 11 is a schematic view of a network architecture NA1 applicable to the aforesaid first to sixth embodiments. Specifically, the network architecture NA1 comprises the user equipment 1, the main mobile hotspot equipment 7, the base station (eNB) or small cell 65, the MME 67, a policy and charging rules function (PCRF) 73, a serving gateway (S-GW) 75, a packet data network gateway (P-GW) 77, and a home location register (HLR) 79. In the network architecture NA1, the main mobile hotspot equipment 7 is used as a relay between a WLAN and a mobile communication network.

The user equipment 1 and the main mobile hotspot equipment 7 connect with each other via a WLAN conforming to the IEEE 802.11 specification. The main mobile hotspot equipment 7 and the base station/small cell 65 communicate with each other via an LTE-Uu interface. The base station/small cell 65 and the S-GW 75 communicate with each other via an S1-U interface. The base station/small cell 65 and the MME 67 communicate with each other via an S1-C interface. The S-GW 75 and the P-GW 77 communicate with each other via an S5/S8 interface. The S-GW 75 and the MME 67 communicate with each other via an S11 interface. The MME 67 and the P-GW 77 communicate with each other via an Gxc interface. The MME 67 and the PCRF 73 communicate with each other via an S6a interface. The P-GW 77 and the PCRF 73 communicate with each other via an S7/Gx interface.

FIG. 12 is a schematic view illustrating a signal transmission process in the network architecture NA1. First, when a user needs to dial an emergency call, the user equipment 1 transmits an emergency call request message 1201 to the main mobile hotspot equipment 7. The main mobile hotspot equipment 7 transmits an emergency attach request message 1203 to the MME 67. Then, the MME 67 performs an identity authentication procedure with the HLR via messages 1205a, 1205b. Then, the MME 67, the main mobile hotspot equipment 7 and the user equipment 1 performs an identity authentication and security confirmation procedure via messages 1207a, 1207b, 1207c and 1207d.

Thereafter, the MME 67 transmits a create session request message 1209 to the S-GW 75 and the P-GW 77 so that it can perform an IP-Connectivity Access Network (IP-CAN) connection procedure with the PCRF via messages 1211a, 1211b. The S-GW 75 and the P-GW 77 then transmit a create session response message 1213 to the MME 67. Next, the MME 67 transmits an attached accept message 1215_1 to the main mobile hotspot equipment 7 so that the main mobile hotspot equipment 7 transmits an attached accept message 1215_2 to the user equipment 1.

After receiving the attached accept message 1215_2, the user equipment 1 transmits an attached complete message 1217_1 to the main mobile hotspot equipment 7 which, in turn, transmits an attached complete message 1217_2 to the MME 67. Thereby, emergency call transmissions can be made between the main mobile hotspot equipment 7 and the user equipment 1, and IP Multimedia Subsystem (IMS) emergency call transmissions 1221 can be made between the main mobile hotspot equipment 7 and the MME 67 & the P-GW 77. In other words, creation of the emergency call transmissions 1219 and the IMS emergency call transmissions 1221 allows the user to make an emergency call via the user equipment 1.

Then when the user is to terminate the emergency call, the user equipment 1 transmits an emergency call terminated message 1223_1 to the main mobile hotspot equipment 7 which, in turn, transmits an emergency call terminated message 1223_2 to the MME 67. After receiving the emergency call terminated message 1223_2, the MME 67 transmits a delete session request message 1225 to the MME 67 and the P-GW 77. Then, the MME 67 and the P-GW transmits a delete session response message 1227 to the MME 67. Finally, the MME 67 transmits a detached complete message 1229_1 to the main mobile hotspot equipment 7 and the main mobile hotspot equipment 7 transmits a detached complete message 1229_2 to the user equipment 1.

Figure 13:
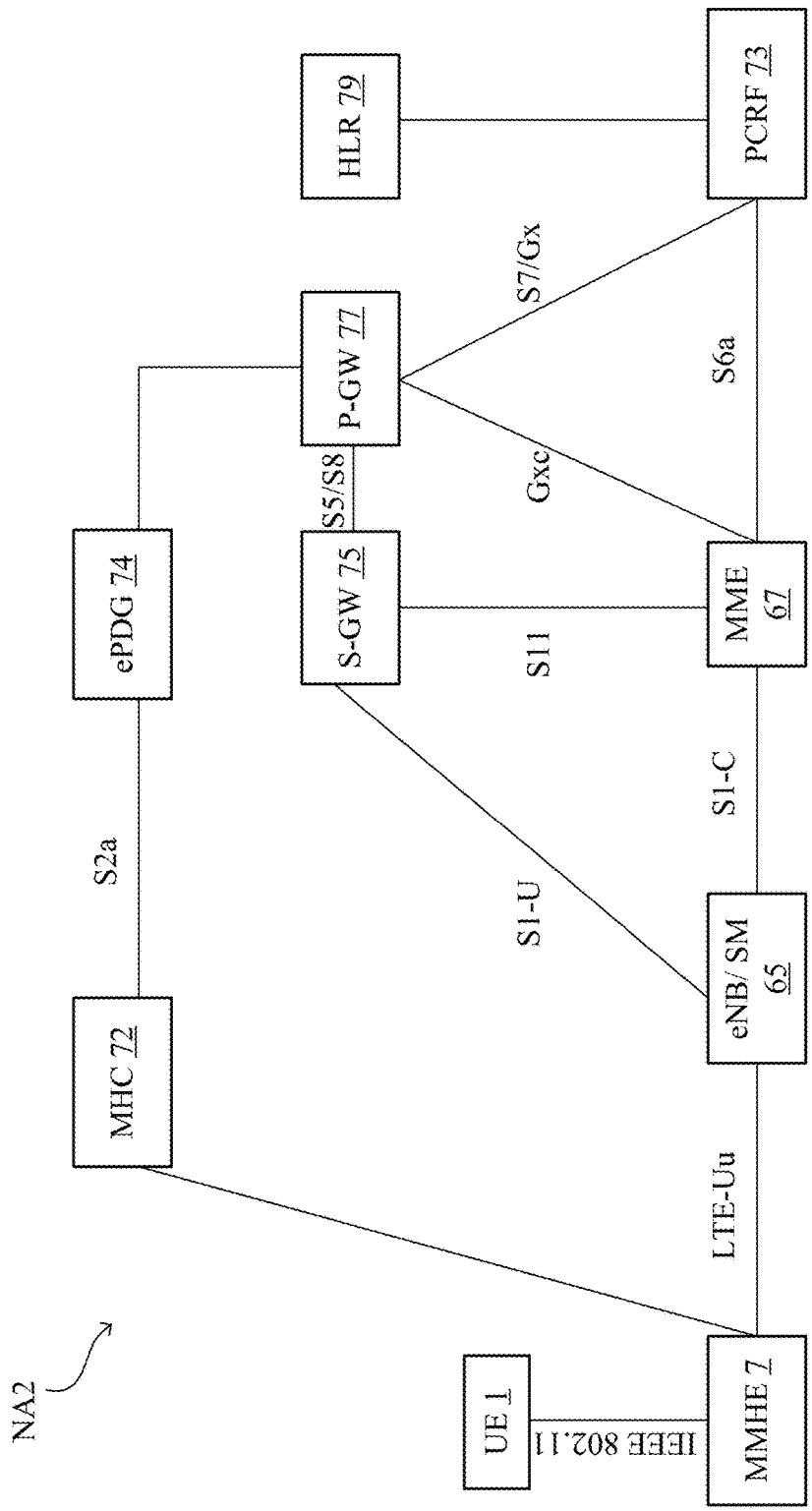
FIG. 13 is a schematic view of a network architecture NA2 according to an eighth embodiment of the present invention.
Figure 14:
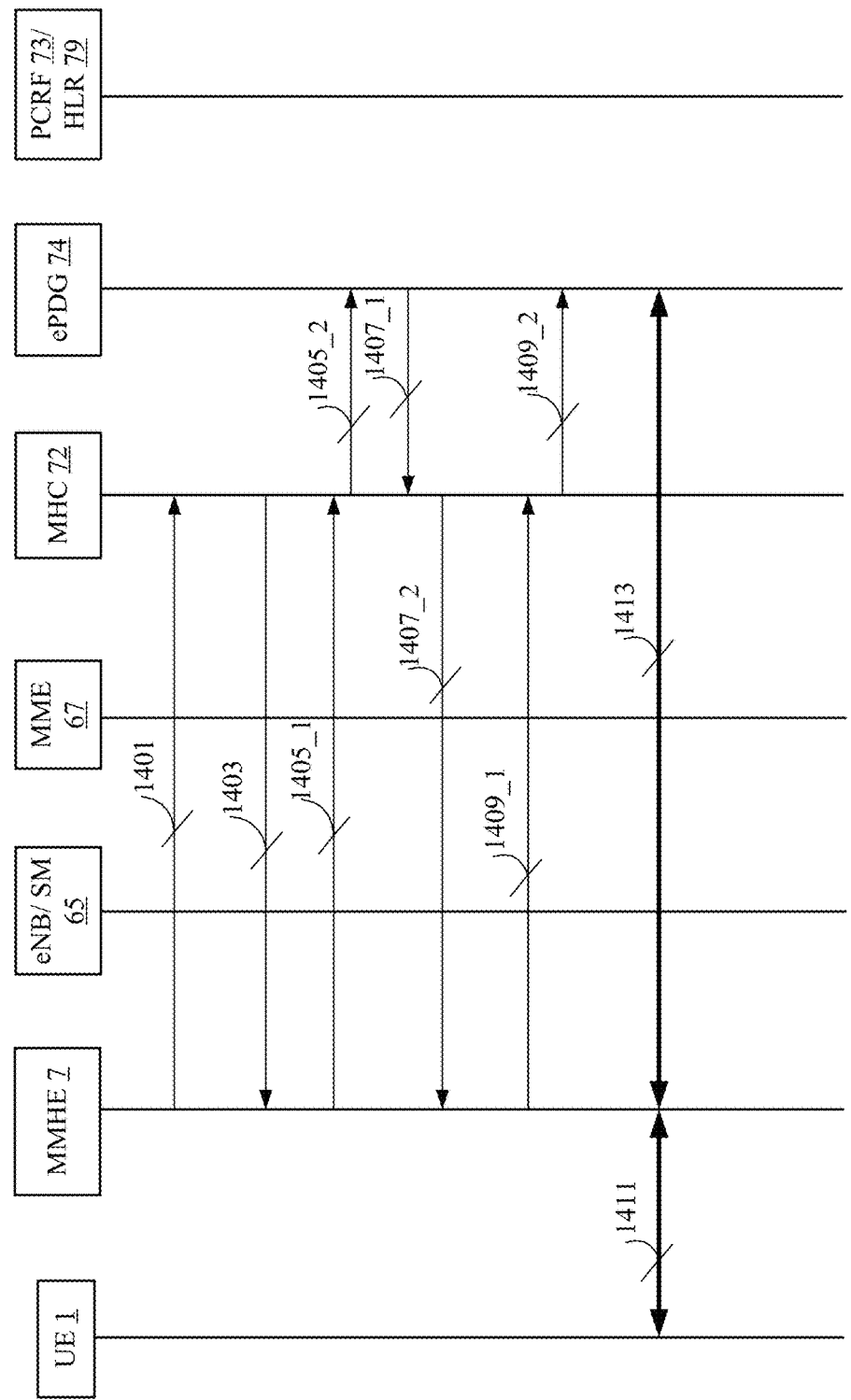
FIG. 14 is a schematic view illustrating a signal transmission process under the network architecture NA2 according to the eighth embodiment.

An eighth embodiment of the present invention is shown in FIG. 13 and FIG. 14. FIG. 13 is a schematic view of a network architecture NA2. The network architecture NA2 is applicable to the aforesaid first to sixth embodiments. Specifically, different from the network architecture NA1, the network architecture NA2 further comprises a mobile hotspot controller (MHC) 72 and an evolved packet data gateway (ePDG) 74. In the network gateway NA2, the main mobile hotspot equipment 7 is a trustworthy WLAN equipment for the backhaul network, and the main mobile hotspot equipment 7 further connects to a mobile hotspot console 72. The mobile hotspot console 72 and the ePDG 74 communicate with each other via an S2a interface, and the ePDG 74 connects to the P-GW 77.

FIG. 14 is a schematic view illustrating a signal transmission process in the network architecture NA2. First, the main hotspot equipment 7 transmits an MHE registration request message 1401 to the mobile hotspot console 72 which, in turn, transmits an MHE registration response message 1403 to the main mobile hotspot equipment 7. Then the main mobile hotspot equipment 7 transmits an MHE attached request message 1405_1 to the mobile hotspot console 72 and the mobile hotspot console 72 transmits an MHE attached request message 1405_2 to the ePDG 74. Thereafter, the ePDG 74 transmits an MHE attached accepted message 1407_1 to the mobile hotspot console 72, and the mobile hotspot console 72 transmits an MHE attached accepted message 1407_2 to the main mobile hotspot equipment 7.

Next, the main mobile hotspot equipment 7 transmits an MHE attached completed message 1409_1 to the mobile hotspot console 72, and the ePDG 74 transmits an MHE attached completed message 1409_2 to the ePDG 74. In this way, emergency call transmissions 1411 can be made between the main mobile hotspot equipment 7 and the user equipment 1, and IP Multimedia Subsystem (IMS) emergency call transmissions 1413 can be made between the main mobile hotspot equipment 7 and the ePDG 74. In other words, creation of the emergency call transmissions 1411 and the IMS emergency call transmissions 1413 allows the user to make an emergency call via the user equipment 1.

Figure 15:
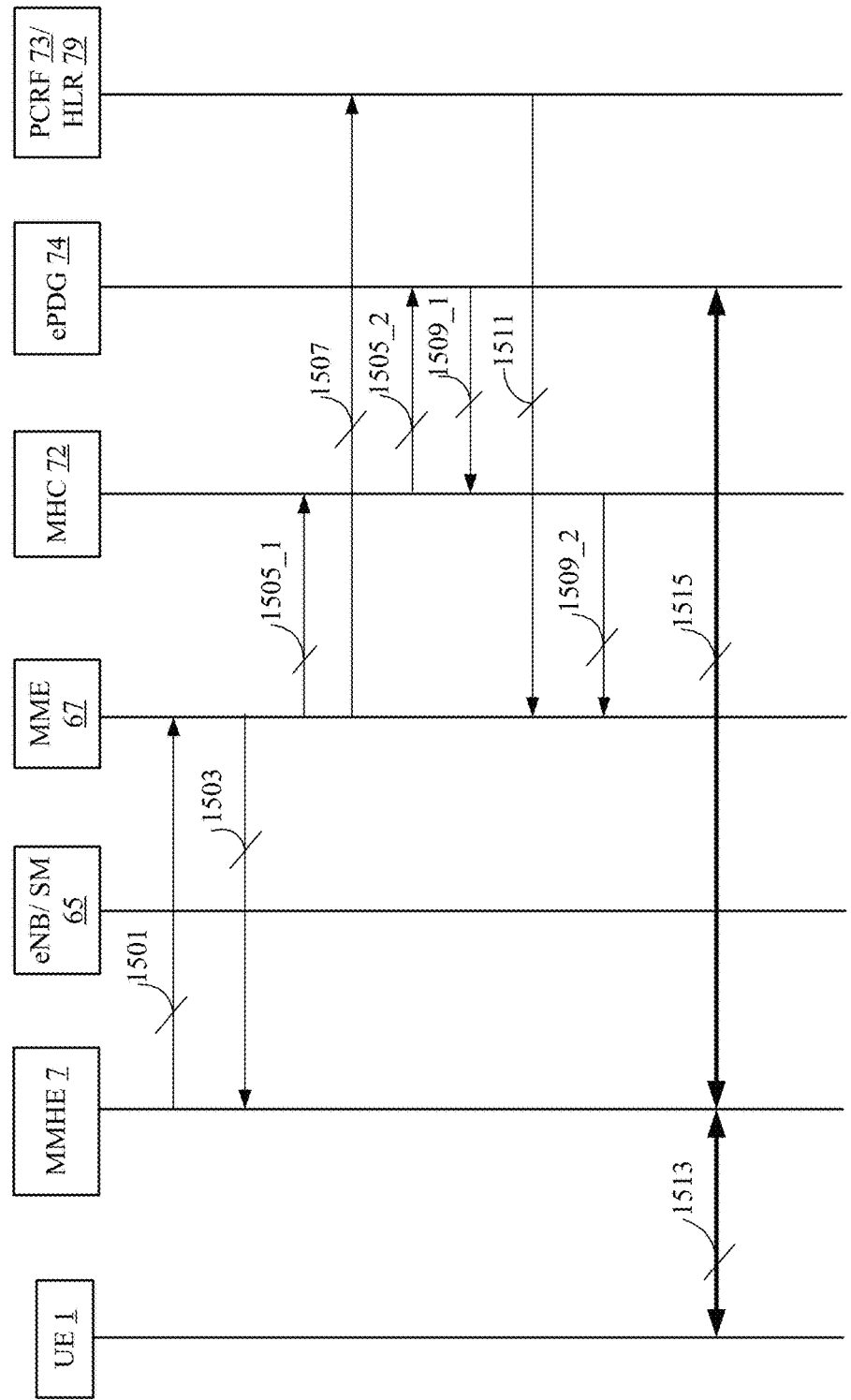
FIG. 15 is a schematic view illustrating another signal transmission process under the network architecture NA2 according to the eighth embodiment.

FIG. 15 is a schematic view illustrating another signal transmission procedure in the network architecture NA2. First, the main mobile hotspot equipment 7 transmits an MHE location update request message 1501 to the MME 67 which, in turn, transmits an MHE location update response message 1503 to the main mobile hotspot equipment 7. Furthermore, the MME 67 transmits an MHE location report message 1505_1 to the mobile hotspot console 72 and transmits an MHE location update message 1507 to the PCRF 73 and the HLR 79. After receiving the MHE location report message 1505_1, the mobile hotspot console 72 transmits an MHE location report message 1505_2 to the ePDG 74.

Next, the ePDG 74 transmits an MHE location confirm message 1509_1 to the mobile hotspot console 72. Further, the PCRF 73 and the HLR 79 transmit an MHE location update confirm message 1511 to the MME 67. After receiving the MHE location confirm message 1509_1, the mobile hotspot console 72 transmits an MHE location confirm message 1509_2 to the MME 67. In this way, emergency call transmissions 1513 can be made between the main mobile hotspot equipment 7 and the user equipment 1, and IP Multimedia Subsystem (IMS) emergency call transmissions 1515 can be made between the main mobile hotspot equipment 7 and the ePDG 74. In other words, creation of the emergency call transmissions 1513 and the IMS emergency call transmissions 1515 allows the user to make an emergency call via the user equipment 1.

According to the above descriptions, the mechanism of establishing an indoor field model according to the present invention is based on movement behaviors of the mobile hotspot equipments, and automatically obtains path loss models of a plurality of areas in an indoor space by using the user equipment to measure corresponding received signal information. Therefore, when arrangement of articles in the indoor space changes, the model of the space field can be updated automatically without hiring additional labors to measure a plurality of fixed points in the indoor space point by point as in the prior art. Accordingly, the mechanism of establishing an indoor field model according to the present invention can reduce the additional labor cost and automatically update the indoor field model in response to changes in arrangement of articles in the indoor space, thereby providing more precise locating services for the user equipment.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment (UE) for a wireless local area network (WLAN), comprising:
   a transceiver, being configured to connect to a backhaul device via a main mobile hotspot equipment and receive a wireless signal from a first surrounding mobile hotspot equipment moving along a movement path in an area of an indoor space; and
   a processor electrically connected to the transceiver, being configured to measure the wireless signal during a time interval and generate received signal information corresponding to the wireless signal, and enable the transceiver to transmit a measurement response message to a backhaul device in a mobile communication network via the main mobile hotspot equipment, the measurement response message having an identity of the first surrounding mobile hotspot equipment and the received signal information;
   wherein the backhaul device establishes a path loss model according to the received signal information and stores the path loss model into a path loss model database, and the path loss model indicates a plurality of relations between a plurality of attenuation power values and a plurality of distances in the indoor space;

wherein the processor further generates a location measurement response message and enables the transceiver to transmit the location measurement response message to the backhaul device via the main mobile hotspot equipment, the location measurement response message comprises a plurality of identities of a plurality of second surrounding mobile hotspot equipments and the received signal information corresponding to each of the second surrounding mobile hotspot equipments so that the backhaul device calculates real-time location information of the user equipment according to the location measurement response message and the path loss model database, and the transceiver receives a location service response message including the real-time location information from the backhaul device via the main mobile hotspot equipment.

2. The user equipment of claim 1, wherein the received signal information is one of received signal strength (RSS) information and signal to noise ratio (SNR) information.

3. The user equipment of claim 1, wherein the wireless signal is a beacon signal.

4. The user equipment of claim 1, wherein the processor further generates a probe request signal and enables the transceiver to transmit the probe request signal so that the first surrounding mobile hotspot equipment transmits a probe response signal, and the wireless signal is the probe response signal.

5. A user equipment (UE) for a wireless local area network (WLAN), comprising:
a transceiver, being configured to connect to a backhaul device via a main mobile hotspot equipment and receive a wireless signal from a first surrounding mobile hotspot equipment moving along a movement path in an area of an indoor space; and
a processor electrically connected to the transceiver, being configured to measure the wireless signal during a time interval and generate received signal information corresponding to the wireless signal, and enable the transceiver to transmit a measurement response message to a backhaul device in a mobile communication network via the main mobile hotspot equipment, the measurement response message having an identity of the first surrounding mobile hotspot equipment and the received signal information;
wherein the backhaul device establishes a path loss model according to the received signal information and stores the path loss model into a path loss model database, and the path loss model indicates a plurality of relations between a plurality of attenuation power values and a plurality of distances in the indoor space;
wherein the processor generates a location service request message and enables the transceiver to transmit the location service request message to the backhaul device via the main mobile hotspot equipment, the location service request message comprises a plurality of identities of a plurality of second surrounding mobile hotspot equipments and received signal information corresponding to each of the second surrounding mobile hotspot equipments so that the backhaul device calculates real-time location information of the user equipment according to the location service request message and the path loss model database, and the transceiver receives a location service response message including the real-time location information from the backhaul device via the main mobile hotspot equipment.

6. A backhaul device for a mobile communication network, comprising:
a storage, being configured to store a path loss model database;
a network interface, being configured to receive a plurality of measurement response messages from a user equipment via a mobile hotspot equipment during a time interval, each of the measurement response messages having an identity of a first surrounding mobile hotspot equipment and received signal information, and the received signal information being generated by the user equipment through measuring a wireless signal during the time interval and being constructed by a plurality of signal measurement data, the wireless signal being transmitted by the first surrounding mobile hotspot equipment moving along a movement path in an area of an indoor space; and
a processor electrically connected to the network interface and the storage, being configured to retrieve a plurality of critical signal measurement data from the signal measurement data according to a received signal index value and a signal variation amount of the signal measurement data, establish a path loss model according to the critical signal measurement data and store the path loss model into the path loss model database, wherein the path loss model indicates a plurality of relations between a plurality of attenuation power values and a plurality of distances in the indoor space.

7. The backhaul device of claim 6, wherein the processor further generates a measurement request message and enables the network interface to transmit the measurement request message to the user equipment via the mobile hotspot equipment so that during the time interval, the user equipment measures the wireless signal transmitted by the first surrounding mobile hotspot equipment in response to the measurement request message.

8. The backhaul device of claim 6, wherein the critical signal measurement data corresponds to a specific time interval within the time interval, the received signal index value of at least one of the critical signal measurement data is larger than a threshold value, and the signal variation amount of the critical signal measurement data is the largest among those of the signal measurement data.

9. The backhaul device of claim 6, wherein the critical signal measurement data corresponds to a specific time interval within the time interval, the received signal index value of at least one of the critical signal measurement data is the largest among those of the signal measurement data, and the signal variation amount of the critical signal measurement data is the largest among those of the signal measurement data.

10. The backhaul device of claim 6, wherein the network interface is further configured to receive a location measurement response message from the user equipment via the mobile hotspot equipment, and the location measurement response message comprises a plurality of identities of a plurality of second surrounding mobile hotspot equipments and received signal information of each of the second surrounding mobile hotspot equipments corresponding to the user equipment so that the processor calculates real-time location information of the user equipment according to the location measurement response message and the path loss model database and enables the network interface to transmit a location service response message including the real-time location information to the user equipment via the mobile hotspot equipment.

11. The backhaul device of claim 6, wherein the network interface is further configured to receive a location service request message from the user equipment via the mobile hotspot equipment, the location service request message comprises a plurality of identities of a plurality of second surrounding mobile hotspot equipments and received signal information of each of the second surrounding mobile hotspot equipments corresponding to the user equipment, and the processor calculates real-time location information of the user equipment according to the location service request message and the path loss model database, and enables the network interface to transmit a location service response message including the real-time location information to the user equipment via the mobile hotspot equipment.

12. A method for establishing a path loss model database for a backhaul device, the backhaul device comprising a storage, a network interface and a processor, the method for establishing a path loss model database comprising:

receiving a plurality of measurement response messages from a user equipment via a mobile hotspot equipment during a time interval, each of the measurement response messages having an identity of a first surrounding mobile hotspot equipment and received signal information, and the received signal information being generated by the user equipment through measuring a wireless signal during the time interval and being constructed by a plurality of signal measurement data, the wireless signal being transmitted by the first surrounding mobile hotspot equipment moving along a movement path in an area of an indoor space;

retrieving a plurality of critical signal measurement data from the signal measurement data according to a received signal index value and a signal variation amount of the signal measurement data; and establishing a path loss model according to the critical signal measurement data and storing the path loss model into the path loss model database, wherein the path loss model indicates a plurality of relations between a plurality of attenuation power values and a plurality of distances in the indoor space.

13. The method for establishing a path loss model database of claim 12, further comprising:

generating a measurement request message and transmitting the measurement request message to the user equipment via the mobile hotspot equipment so that during the time interval, the user equipment measures the wireless signal transmitted by the first surrounding mobile hotspot equipment in response to the measurement request message.

14. The method for establishing a path loss model database of claim 12, wherein the critical signal measurement data corresponds to a specific time interval within the time interval, the received signal index value of at least one of the critical signal measurement data is larger than a threshold value, and the signal variation amount of the critical signal measurement data is the largest among those of the signal measurement data.

15. The method for establishing a path loss model database of claim 12, wherein the critical signal measurement data corresponds to a specific time interval within the time interval, the received signal index value of at least one of the critical signal measurement data is the largest among those of the signal measurement data, and the signal variation amount of the critical signal measurement data is the largest among those of the signal measurement data.

16. The method for establishing a path loss model database of claim 12, further comprising:

receiving a location measurement response message from the user equipment via the mobile hotspot equipment, the location measurement response message comprising a plurality of identities of a plurality of second surrounding mobile hotspot equipments and received signal information of each of the second surrounding mobile hotspot equipments corresponding to the user equipment; and calculating real-time location information of the user equipment according to the location measurement response message and the path loss model database, and transmitting a location service response message including the real-time location information to the user equipment via the mobile hotspot equipment.

* * * * *